United States Patent [19]

Burks et al.

[11] Patent Number: 5,396,417
[45] Date of Patent: Mar. 7, 1995

[54] PRODUCT DISTRIBUTION EQUIPMENT AND METHOD

[75] Inventors: Rupert T. Burks, New York, N.Y.; Joseph M. Boska, Sandy, Utah

[73] Assignee: Capitol Cities/ABC, Inc., New York, N.Y.

[21] Appl. No.: 786,272

[22] Filed: Nov. 1, 1991

[51] Int. Cl.⁶ .............................................. G06F 15/21
[52] U.S. Cl. ..................................... 364/401; 340/825
[58] Field of Search ................. 364/401, 406, 405; 235/381–383; 340/825, 706, 711; 341/173; 395/148–149, 500; 382/47

[56] References Cited

U.S. PATENT DOCUMENTS

| | | | |
|---|---|---|---|
| 3,942,157 | 3/1976 | Azure | 304/900 |
| 4,545,023 | 10/1985 | Mizzi . | |
| 4,559,614 | 12/1985 | Peek et al | 395/500 |
| 4,688,170 | 8/1987 | Waite et al. | 340/717 |
| 4,791,558 | 12/1988 | Chaitin et al. . | |
| 4,866,661 | 9/1989 | de Prins | 235/383 |
| 4,903,200 | 2/1990 | Mook, Jr. | 364/405 |
| 4,972,463 | 11/1990 | Danielson et al. . | |
| 5,013,897 | 5/1991 | Harmon et al. | 235/381 |
| 5,095,195 | 3/1992 | Harmon et al. | 235/383 |
| 5,142,622 | 8/1992 | Owens | 395/500 |
| 5,157,769 | 10/1992 | Eppley et al. | 395/500 |

FOREIGN PATENT DOCUMENTS 0282992 9/1988 Japan ........................... G06K 71/08

Primary Examiner—Gail O. Hayes
Attorney, Agent, or Firm—Curtis Morris & Safford

[57] ABSTRACT

A data collection device and method, particularly for point-of-sale systems used in the sales and rental of merchandise including video records, and more particularly for a revenue-sharing video record rental system. In such a revenue-sharing system, both revenue-sharing records and ordinary merchandise can be sold using the same point-of-sale entry system. Data relating to the sales of rental of records is separated from the other data generated at the point-of-sale terminals by a data capture device, and the separated data is transmitted to a central computer where it is further processed to separate revenue-sharing record data from other record data, compute the shares due the store proprietor and the distributor of the revenue-sharing records, and for the performance of other functions. The data capture device is usable with a very wide variety of current point-of-sale computers and software so that the store owner can participate in the revenue-sharing system without the expense of buying new software compatible with the central computer. A relatively inexpensive, small-footprint data input terminal is provided.

33 Claims, 21 Drawing Sheets

```
TEACHER Version 1.21  Copyright (c) 1991 ABC Video Enterprises
Installed Successfully Press ALT+Left-Shift to activate

```
═══ INVOICE NUMBER   1 ═══ 10:47 AM ═══ 09-23-91 ═══ CAR ═══
CASHR/DRAWER:    0     CUSTOMER FILE NUMBER: 1                ITEMS OUT:  0/0
SALESPER:        0     CUSTOMER NUM/NAME/PHONE:  1  J. SMITH  TOT RENTS:    1
DAYS OUT:        1             MEMBERSHIP FEE:      0.00      CREDITS DUE:  0
DAYS CHARGE:     1     MEMB PRICING TYPE (0-3): 0    ITEM NUMBER (1-92999):
```

| NO. | DESCRIPTION | RSCF | DAY O | DAY C | CHARGE | DUE DATE | DUE TM | A/P |
|---|---|---|---|---|---|---|---|---|
| 1 1001 | MOV GONE WITH TH | R | 1 | 1 | 7.00 | 09-24-1991 | 4:00 | PM |

```
TOTAL RENT:   7.00    MEMB FEE:   0.00    MEM TYP=0    ACT BAL=0
TOTAL SALE:   0.00                                     SUB TOTAL:  7.00       NOT RESERVED
MISC CHRGS:   0.00                                     SALES TAX:  0.47
                                                       TOTAL:      7.47       [Esc] = END.
[F1]       [F2]       [F3]    [F4]    [F5]    [F6]    [F7]    [F8]    [F9]    [F10]
CURSOR↑    CURSOR↓    DAY O   DAY C   CHKIN   CUSTM           MISC.   GRID    ABORT
```

FIG. 4G

```
== INVOICE NUMBER  1 ==        10:47 AM == 09-23-91 == CAR ==
CASHR/DRAWER:   0    CUSTOMER FILE NUMBER: 1           ITEMS OUT:   0/0
  SALESPER:    0  CUSTOMER NUM/NAME/PHONE:  1  J. SMITH   TOT RENTS:   1
DAYS OUT: 1              MEMBERSHIP FEE:  0.00          CREDITS DUE:   0
DAYS CHARGE: 1   MEMB PRICING TYPE (0-3): 0   ITEM NUMBER (1-92999):
```

| NO.   | DESCRIPTION        | RSCF | DAY O | DAY C | CHARGE | DUE DATE    | DUE TM | A/P |
|-------|--------------------|------|-------|-------|--------|-------------|--------|-----|
| 1 1001 | MOV GONE WITH TH  | R    | 1     | 1     | 7.00   | 09-24-1991  | 4:00   | PM  |

```
                                      MEM TYP=0              ACT BAL=0
TOTAL RENT:   7.00   MEMB FEE:  0.00        SUB TOTAL:  7.00
TOTAL SALE:   0.00                          SALES TAX:  0.47    NOT RESERVED
MISC CHRGS:   0.00                              TOTAL:  7.47   [Esc] = END.
  [F1]   [F2]   [F3]   [F4]   [F5]   [F6]   [F7]   [F8]   [F9]   [F10]
ALT+/=Rentals Z=Returns
```

FIG. 4H

```
=== INVOICE NUMBER   1 ===  10:47 AM == 09-23-91 == CAR
CASHR/DRAWER:  0    CUSTOMER FILE NUMBER:  1         ITEMS OUT:  0/0
SALESPER:      0    CUSTOMER NUM/NAME/PHONE:  1   J. SMITH   TOT RENTS:  1
DAYS OUT:      1        MEMBERSHIP FEE:   0.00          CREDITS DUE:  0
DAYS CHARGE:   1    MEMB PRICING TYPE (0-3):  0     ITEM NUMBER (1-929899):
```

| NO. |      | DESCRIPTION      | RSCF | DAY O | DAY C | CHARGE | DUE DATE   | DUE TM | A/P |
|-----|------|------------------|------|-------|-------|--------|------------|--------|-----|
| 1   | 1001 | MOV GONE WITH TH | R    | 1     | 1     | 7.00   | 09-24-1991 | 4:00   | PM  |

```
TOTAL RENT:   7.00                   MEM TYP=0           ACT BAL=0
TOTAL SALE:   0.00    MEMB FEE:  0.00         SUB TOTAL:   7.00      NOT RESERVED
MISC CHRGS:   0.00                            SALES TAX:   0.47    [Esc] = END.
                                              TOTAL:       7.47
 [F1]    [F2]    [F3]    [F4]    [F5]    [F6]    [F7]    [F8]    [F9]    [F10]
Rent/Ret; Alt+ 1=LM1 2=LM2 3=LM3 4=LM4 5=Cust 6=Type 7=Qty 8=Void 9=Title 0=Price
```

FIG. 4I

| INVOICE NUMBER | 1 | CUSTOMER FILE NUMBER: | | 10:47 AM — 09-23-91 — CAR | ITEMS OUT: | 0/0 |
|---|---|---|---|---|---|---|

CASHER/DRAWER: 0 CUSTOMER FILE NUMBER: 1 ITEMS OUT: 0/0
SALESPER: 0 CUSTOMER NUM/NAME/PHONE: 1 J. SMITH TOT RENTS: 1
DAYS OUT: 1 MEMBERSHIP FEE: 0.00 CREDITS DUE: 0
DAYS CHARGE: 1 MEMB PRICING TYPE (0-3): 0 ITEM NUMBER (1-92999):

| NO. | DESCRIPTION | RSCF | DAY O | DAY C | CHARGE | DUE DATE | DUE TM | A/P |
|---|---|---|---|---|---|---|---|---|
| 1 1001 | MOV GONE WITH TH | R | 1 | 1 | 7.00 | 09-24-1991 | 4:00 | PM |

TOTAL RENT: 7.00 MEMB FEE: 0.00 MEM TYP=0 ACT BAL=0
TOTAL SALE: 0.00 SUB TOTAL: 7.00 NOT RESERVED
MISC CHRGS: 0.00 SALES TAX: 0.47 [Esc] = END.
TOTAL: 7.47

[F1] [F2] [F3] [F4] [F5] [F6] [F7] [F8] [F9] [F10]
Rent 215; Alt4 1=LM1 2=LM2 3=LM3 4=LM4 5=Cust 6=Type 7=Qty 8=Void 9=Title 0=Price

FIG. 4J

| | INVOICE NUMBER: | 1 | | 10:47 AM = 09-23-91 = CAR | | | |
|---|---|---|---|---|---|---|---|
| CASHR/DRAWER: | 0 | CUSTOMER FILE NUMBER: | 1 | | ITEMS OUT: | 0/0 | |
| SALESPER: | 0 | CUSTOMER NUM/NAME/PHONE: | J. SMITH | | TOT RENTS: | 1 | |
| DAYS OUT: | 1 | MEMBERSHIP FEE: | 0.00 | | CREDITS DUE: | 0 | |
| DAYS CHARGE: | 1 | MEMB PRICING TYPE (0-3): | 0 | ITEM NUMBER (1-92999): | | | |

| NO. | DESCRIPTION | RSCF | DAY O | DAY C | CHARGE | DUE DATE | DUE TM | A/P |
|---|---|---|---|---|---|---|---|---|
| 1 1001 | MOV GONE WITH TH | R | 1 | 1 | 7.00 | 09-24-1991 | 4:00 | PM |

| | | | | | | |
|---|---|---|---|---|---|---|
| TOTAL RENT: | 7.00 | MEMB FEE: | 0.00 | SUB TOTAL: | 7.00 | ACT BAL=0 |
| TOTAL SALE: | 0.00 | | | SALES TAX: | 0.47 | NOT RESERVED |
| MISC CHRGS: | 0.00 | MEM TYP=0 | | TOTAL: | 7.47 | [Esc] = END. |

Rentals: ALT4 1=LM1 2=LM2 3=LM3 4=DV 5=CUST 6=TYPE 7=QTY 8=VOID 9=TITLE 0=Price
[F1] [F2] [F3] [F4] [F5] [F6] [F7] [F8] [F9] [F10]

PRODUCT DISTRIBUTION EQUIPMENT AND METHOD

This invention relates to systems and methods for the selective collection and processing of data, particularly in point-of sales systems, and especially in the distribution of video records. In particular, this invention relates to a method and system for collecting and transmitting video record rental data to a processing device at a remote location for revenue-sharing purposes.

In the business of renting video tape records of movies, distributors such as motion picture studios normally sell the tape cassettes at relatively high prices to the rental stores. As a result, the rental store owners are required to make a relatively large capital investment in order to buy enough tapes to meet their customers' needs. Often the owner can not afford to purchase the quantity of video tapes required to satisfy the demand. The result is that both the distributors and the rental stores lose revenues, and some members of the public do not get the opportunity to rent the movie of their choice.

In response to these problems, video tape revenue-sharing rental methods have been proposed and developed. In one such method, a video tape store owner may obtain a video tape from a studio or other distributor for a relatively small initial cost. Thereafter, each time the video tape is rented, the distributor receives a certain percentage of the rental income. After a video tape has been rented a certain number of times, or after a predetermined time period has passed since the video tape was first offered for rent, the video tape may be offered for sale to the public and the proceeds divided between the store owner and the distributor.

All parties benefit from such an arrangement. The public has more copies of a movie available to rent, the store owner can reduce the amount of capital tied up in the tapes, and both the store owners and the distributors earn more revenues from the added rentals. This may induce the motion picture studios to release movies on video tape much sooner, or even simultaneously with the movies' release to theaters, so that a greater portion of the public can enjoy the movies sooner and at a lower cost.

The above-described rental method preferably is carried out by a computer system such as that shown in U.S. Pat. Nos. 5,029,034, issued Jul. 2, 1991, and U.S. Pat. No. 5,050,031, issued Sep. 17, 1991. Both of those patents are assigned to the assignee of the present patent application.

The system shown in those patents is highly advantageous; it enables the transmission of rental data from many different retail rental store terminals to a central computer or processor. This system computes the shares of video rentals earned by the retailers and distributors, prepares reports regarding rental transactions, and otherwise handles the accounting for the transactions electronically, as it is described in greater detail in those patents.

The system shown in those patents has the advantage that the speed and cost of collecting rental data is greatly improved. If desired, "counting cassettes" also can be used to count the number of plays of a video record by the customer, and the rental charge can be based on the number of plays.

In one known commercial system using one embodiment of the invention shown in those patents, all of the transaction data including rental and sale information of each store is transmitted to the central computer from each rental terminal. A problem with that arrangement is that many stores sell other products such as sweatshirts, candy, etc. in addition to renting or selling video records. Therefore, the video record business forms only a portion of the business of many rental stores. This is particularly true where the store is one which primarily sells other merchandise, such as supermarkets, department stores, etc. Therefore, there is a substantial amount of data which must be sorted out from the record rental information. This sorting should be done in the stores before the transmission of data to the central computer to prevent overloading the central computer equipment, thus increasing its cost, and also increasing the cost of data transmission and processing. For this reason, special features presently are required in the software used in the rental store to sort the extraneous data out before transmission to the central computer. Without such features, the software is incompatible with that of central computer.

Another problem is caused by the diversity of different point-of-sale computers and software which are used by video record retailers. Only a relatively few of the software packages have been modified to make them compatible with the central computer. Therefore, in order for retailers to participate in the revenue-sharing program, they often are required to buy relatively expensive compatible software to replace that which they already have. Also, they are required to re-train their employees to use the new software.

Another problem exists even with rental stores which have compatible software in that they may not have a compatible local area network operating software.

Another problem is that some rental stores do not have any computerized point-of-sale equipment at all. Therefore, even the smallest rental store is forced to acquire relatively sophisticated and expensive computer equipment in order to be able to participate in the revenue-sharing plan.

In either of the foregoing circumstances, the relatively high cost of acquiring new computer hardware and/or software is a significant deterrent to participation in the revenue-sharing plan.

Accordingly, an object of the present invention is to provide equipment and methods for merchandise distribution data processing which overcomes or substantially alleviates the foregoing problems.

More specifically, it is an object of the present invention to provide equipment and methods for use in video record revenue-sharing which significantly reduce the cost of entry into the revenue-sharing plan.

Another object of the invention is to provide a data collection system and method which can be used with a wide variety of computers and software without significant modifications.

It also is an object of the invention to provide a relatively low-cost and compact point-of-sale input terminal.

The foregoing objects are met by the provision of a data collection means and method, operating on signals used to display data in the local computers, to collect data for transmitting to a central computer. In a specific embodiment of the invention, the data is video record rental and sale data from retail distribution locations.

If desired, the rental data is segregated from that relating to the sale of other merchandise, and the data for revenue-sharing rentals is identified so that it can be further segregated by the central computer. Alternatively, if desired, the revenue-sharing data can be segregated locally so that only it will be sent to the central computer. Optionally, the revenue-sharing data can include pay-per-play data developed by the use of play-counting cassettes.

The invention is capable of segragating rental transaction data from sales transaction data. Additionally, revenue-sharing rental transaction data can be segregated from non-revenue sharing data. Further, if desired, sending of transaction data to the central computer can be controlled on a product or title ID basis.

Selecting data from that used by display devices in the local point-of-sale ("POS") systems has the advantage that the data collection equipment used can be largely standardized and need not be customized to be compatible with each of the multitude of hardware and software systems now used as point-of-sale equipment. The data sent to the display device (display screen or printer, e.g.) almost always is in ASCII code. Therefore, a device responsive to that code will be useable with almost all such equipment.

The invention includes a method for integrating into a data processing network, POS equipment which has incompatible software. A display data analyzing device is connected to the POS equipment to separate out and transmit to the central computer the data desired. Since the original POS equipment and software need not be changed, the cost of entry into the revenue-sharing plan is reduced significantly.

Display data sent to the display screen and/or printer of the usual POS system is formatted by the system software so that predetermined data usually appears in a predetermined location on the screen and/or printed invoice, or receipt or other business form. In the present invention, advantage is taken of this fact to provide a relatively fast, inexpensive means for selecting data.

The data is selected on the basis of its location on the display. Preferably, this is done by forming movable outlines of variable size on the display and capturing any data which falls within the outlines. In addition, recognition marks are placed on the display to identify that display as one which contains data to be captured; for example, data pertaining to the rental or sale of video records.

Advantageously, the recognition marks and the location and size of the windows can be varied individually in each POS system, either locally by relatively simple manipulations of the POS system controls, or by a command downloaded from the central computer. Thus, each data collection device may be customized to accommodate the individual needs of the POS system. Moreover, this can be done by an ordinary installer who need not be a computer programmer.

Changes made in the data collection system or POS system after installation similarly can be accommodated easily. For example, if the retailer decides to start renting play-counting tape cassettes such as those described in the above-identified patents, and therefore must capture data indicating the number of plays, the changes in the data capture procedures can be made relatively quickly and inexpensively.

A novel small-footprint data entry terminal is provided to reduce the cost and size of the POS equipment used by the retailer.

The small-footprint terminal has a keyboard with substantially less than a full complement of alphabetic character entry keys. Preferably, the keyboard has no such keys; rather, it has numerical keys and dedicated but programmable keys for entering specific data relating to video record transactions. This saves the cost and space required for a full keyboard, and makes the recording of a transaction faster and simpler.

Preferably, the small footprint terminal has a relatively small display using segmented elements, for example, dot matrix elements, to form the characters. A two-line, forty-character, LCD display is preferred. This small display provides all the display capacity needed, while saving the space and cost of a large video display.

The small-footprint terminal is operated as a slave from an ordinary personal computer used as a master in a local area network.

Other objects, features and advantages of the present invention will be set forth in or apparent from the following detailed description and drawings. In the drawings.

Figure 5:
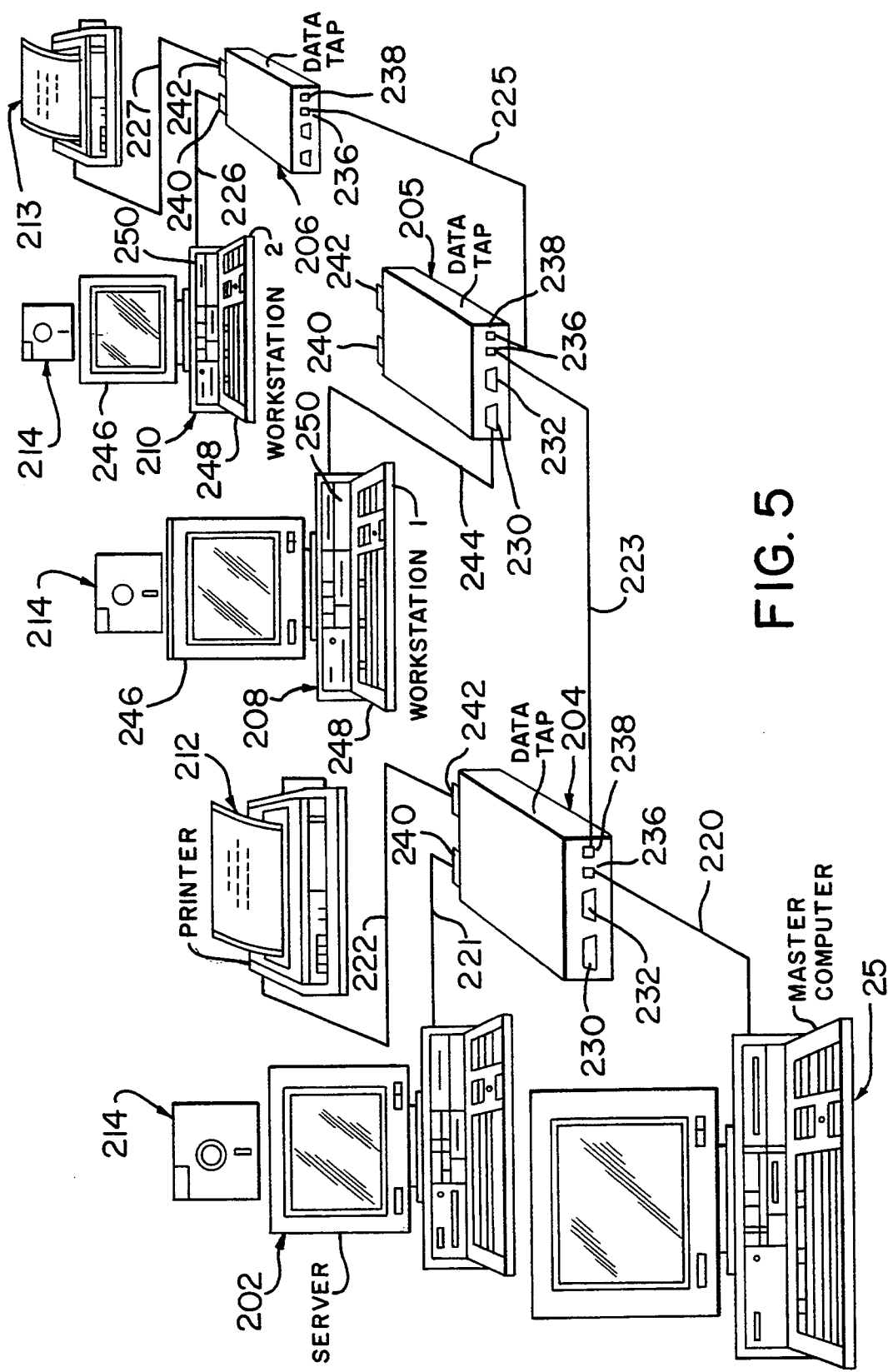
Figure 6:
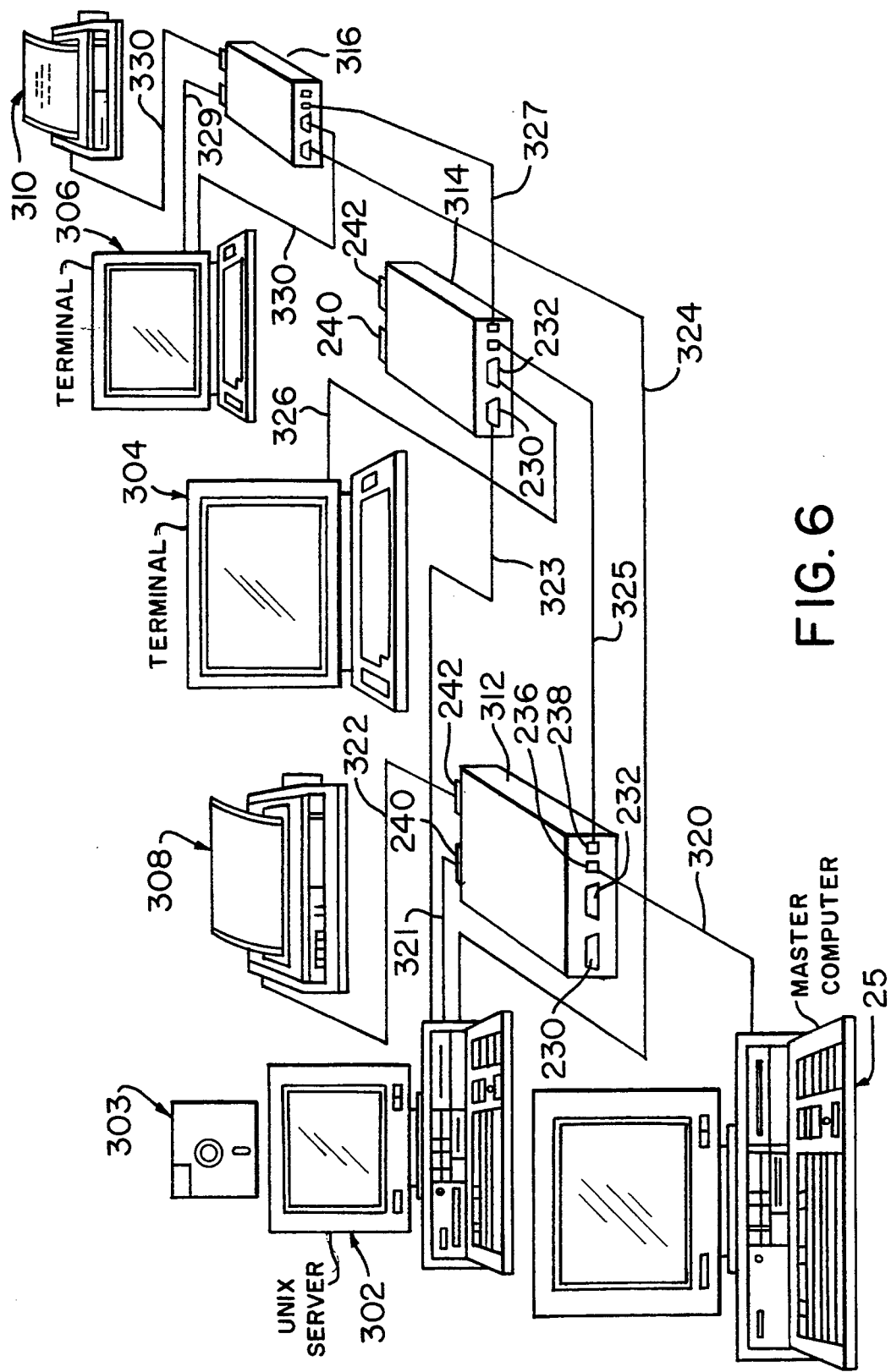
Figure 7:
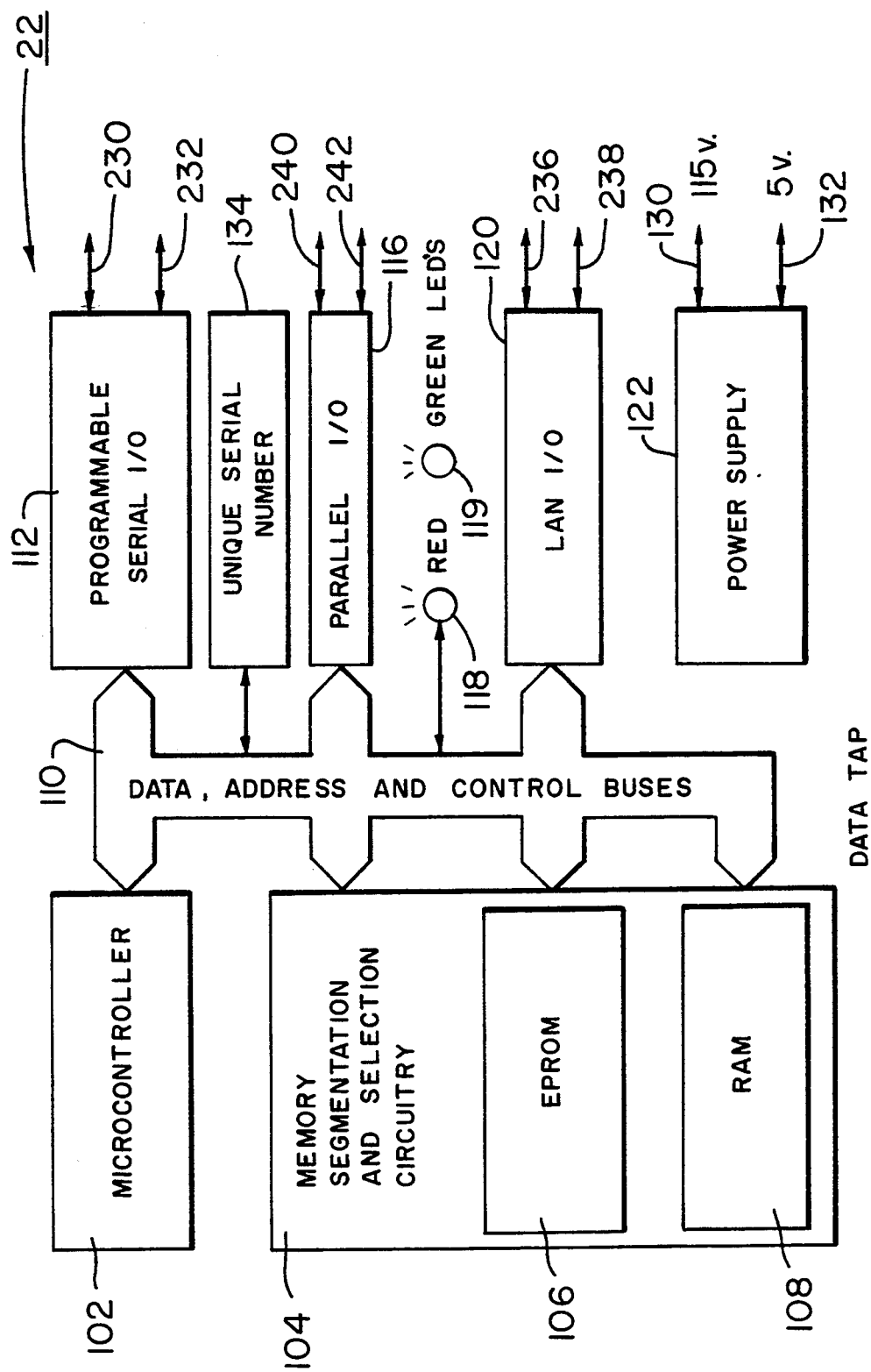
Figure 8:
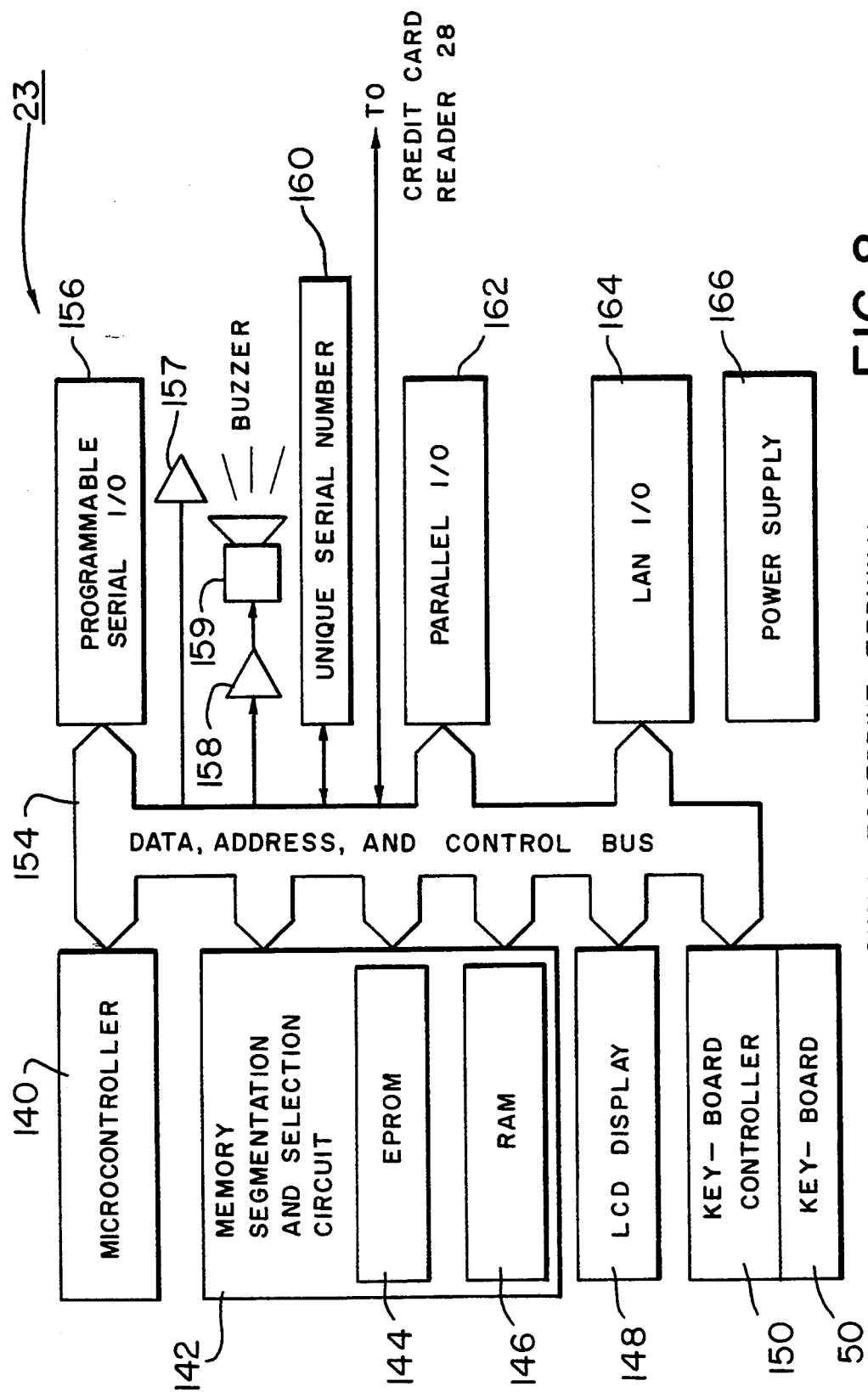
Figure 9:
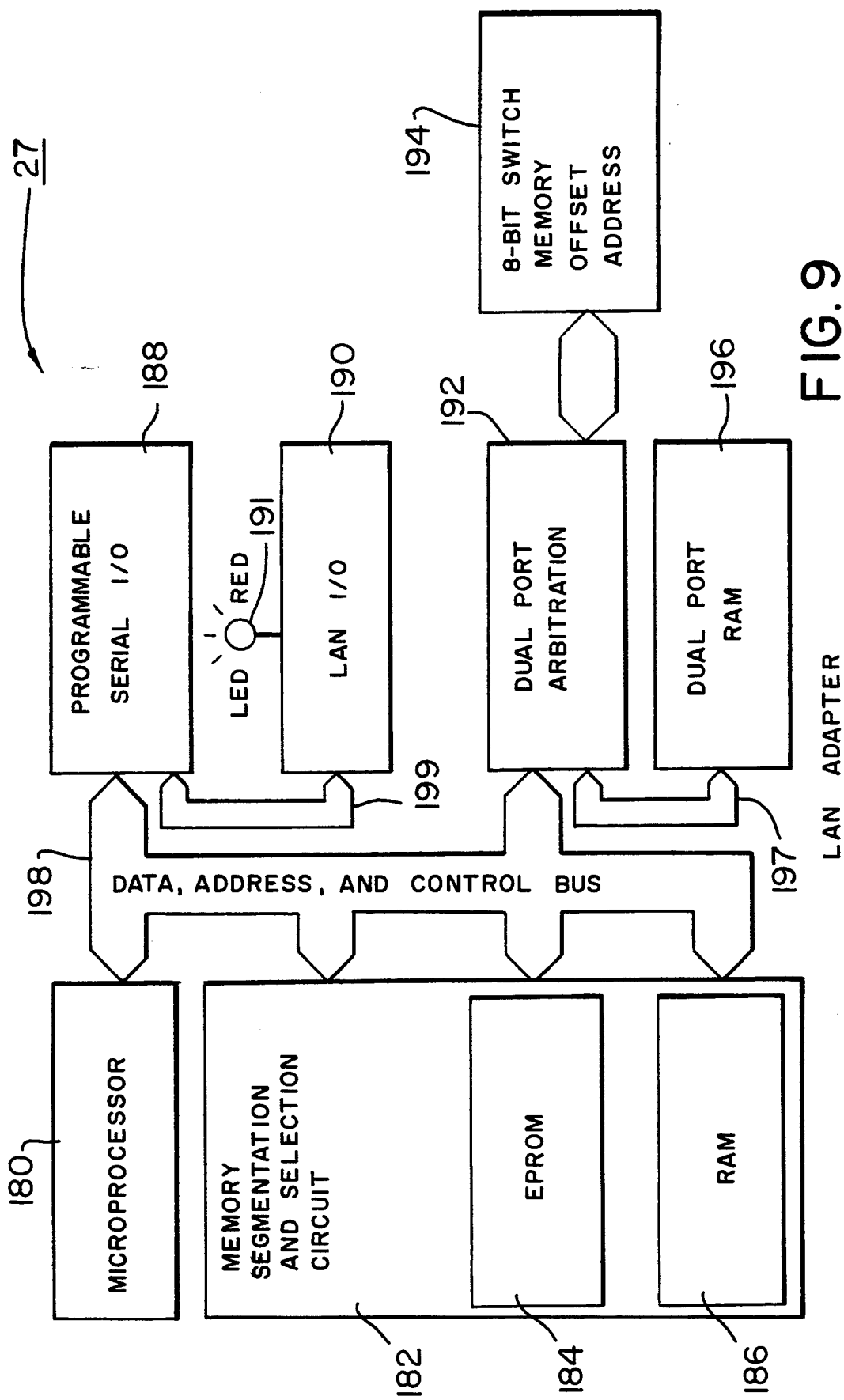
Figure 10:
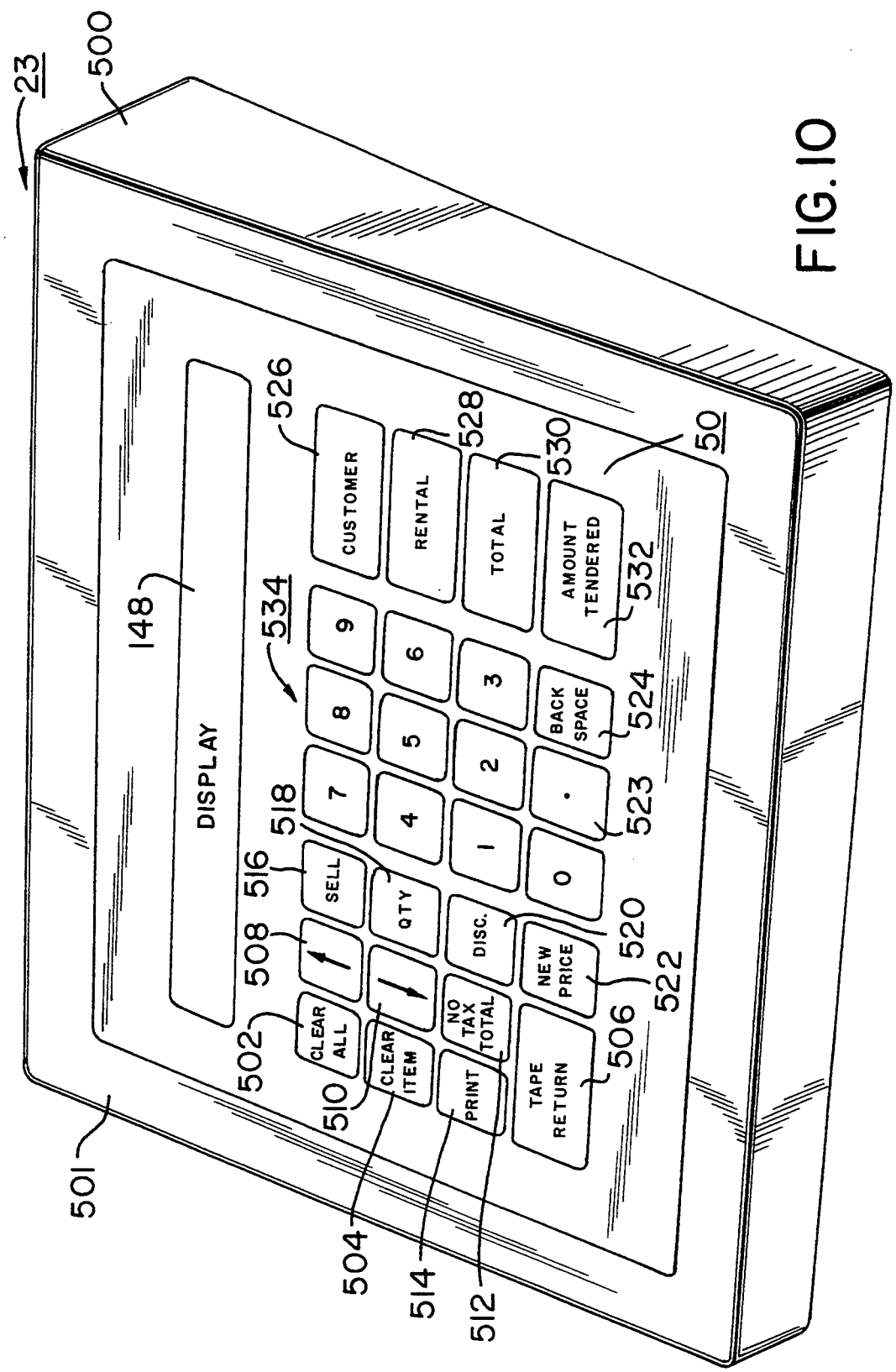

FIGS. 4A, 4B, 4C-1, 4C-2, 4D-1 and 4D-2 comprise flow charts for computer programs utilized in the invention;

FIGS. 4E, 4F, 4G, 4H, 4I and 4J represent respective screens which may appear on a CRT display;

FIGS. 5 and 6 are schematic, partially perspective views of further embodiments of the point-of-sale system of the invention;

FIG. 7 is a schematic circuit diagram of a "data tap" or collection device constructed in accordance with the invention;

FIG. 8 is a block diagram of the circuitry of a small footprint data entry terminal ("SFT") constructed in accordance with the invention;

FIG. 9 is a schematic circuit diagram of a LAN adapter constructed in accordance with the invention; and FIG. 10 is a perspective view of the small-footprint data entry terminal ("SFT") whose circuitry is shown in FIG. 8.

GENERAL DESCRIPTION

Figure 1:
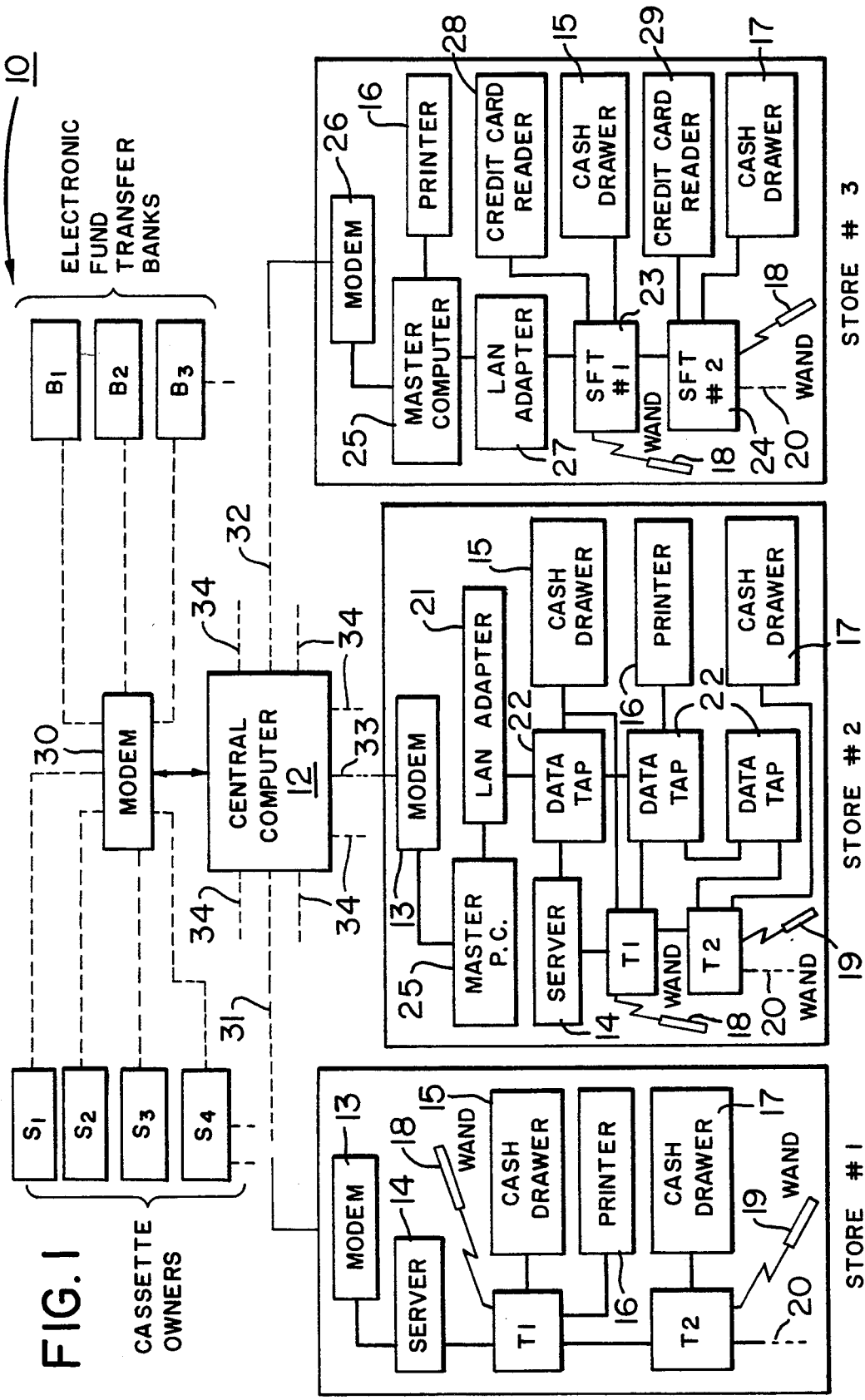
FIG. 1 is a block diagram of a video record rental revenue-sharing system constructed in accordance with the present invention.

FIG. 1 shows a video tape record revenue-sharing distribution system 10 constructed in accordance with the present invention. FIG. 1 is schematic and shows only a small part of an actual system which typically would be used commercially.

The system 10 includes a central computer or processor 12 which communicates with a point-of-sale ("POS") system in each of a large number of individual video record retail stores. Only three such stores, Stores No. 1, No. 2 and No. 3 are shown in FIG. 1, by way of example.

The POS equipment in Store No. 1 is conventional prior art equipment. It comprises a local area network which includes a personal computer 14 used as a server. The server 14 uses programming compatible with that of the central computer. Also included are two slave terminals T1 and T2. The server or PC 14 is connected to a dial-up modem 13. The server 14 through the use of the modem 13 periodically calls up the central computer 12 and transmits accumulated rental transaction data for the store to the central computer over telephone lines 31, which if it is a long distance call would preferably be through one of the long distance systems such as "Tymnet", "Sprint", "MCI" or "AT&T". Alternately, the central computer 12 may periodically call up the modem and cause it to transmit the accumulated rental transaction data for the store to the central computer over the telephone lines.

The central computer or processor 12 processes the data it receives by first separating the data regarding revenue-sharing cassettes from all of the other data it receives. Then, it computes the shares of the revenues due to the cassette owners or distributors and to the retailers. Reports and funds are sent to the respective participants in the revenue-sharing program according to a formula previously agreed upon. If desired, reports can be transmitted through a modem 30 and telephone lines to computers such as $S_1$–$S_4$ at the places of business of the cassette owners. Alternatively, reports can be sent by ordinary mail or telecopier, etc.

Payments from the retailers can be made by conventional means, or by means of electronic fund transfer banks $B_1$, $B_2$, $B_3$, etc., as it is more fully described in the above-identified patents. Payments can be made to the entity owning and operating the system 10, which then pays the cassette owners and retains its share of the revenues.

As it is indicated in FIG. 1, many other stores in the revenue-sharing system communicate over other telephone lines 34 with the central computer 12. Each of those other stores can have point-of-sale equipment and software such as that shown in one of Stores No. 1, 2 and 3, or other combinations shown herein, or in any other desired combination.

STANDARD POS SYSTEM

The point-of-sale ("POS") system in Store No. 1 includes, in addition to the modem 13, server 14 and terminals T1 and T2, a cash drawer 15 or 17 for each terminal T1 or T2, and a printer 16 which is connected to one of the terminals T1 and T2 to print receipts and other matter in the normal transaction of retail video store business.

Each terminal has a bar-code reading wand 18 or 19 to read bar-coded product identification numbers and other product data into the terminal. A credit-card reader (not shown in Store No. 1) often is used with each terminal.

The server 14 also can be used as a sales terminal, and can have its own cash drawer, bar-code reader, credit card reader and printer, if desired.

The server can have local area network ("LAN") adapter equipment, file servers, and other equipment used in a local area network. Each terminal T1, T2 usually has a video display screen, a keyboard, hard disc and/or soft or floppy disc drives, etc., as in conventional personal computers.

Of course, if only one sales terminal is needed, the PC 14 can be used, together with a printer, wand, cash drawer, etc., as the only input terminal.

If needed, further terminals can be added, as indicated by the dashed line 20.

As it has been stated above, point-of-sale systems like the one in Store No. 1 are in widespread use in video stores throughout the United States and elsewhere in the world. However, in order for such systems to operate with the central computer 12, the software they use must be compatible with that used in the central computer. Specifically, the software should segregate the video record transactions from the others into separate files which may be then transmitted to the central computer in pre-defined data record formats. Further, video record titles which are used in the store are matched to the standard titles as defined by the central computer.

Only a few of the software packages designed for video rental store use have been modified to be compatible with the central computer software in the known revenue-sharing system in the U.S.A., the one which is operated by Rentrak Corporation. Therefore, the owners of many stores having point-of-sale computer equipment are forced to buy expensive compatible software and re-train their employees to use the new software in order for the retailer to participate in the revenue-sharing program. This is daunting and creates a substantial impediment to the growth of revenue sharing and its benefits.

ADAPTED POS SYSTEM

Store No. 2 has exactly the same point-of-sale equipment as store No. 1 except that its software is not compatible with that of the central computer 12. However, it has been adapted, in accordance with the present invention, to be operable with the central computer 12 without replacing the incompatible software already in use.

In accordance with the present invention, three novel devices called "data taps" 22 are used together with a LAN adapter card 21, a master PC 25 and software stored in the server 14, terminals T1 and T2 and in the master PC 25. Each data tap 22, as will be described in greater detail below, separates the information regarding video record rentals from the data which is sent to the printer or the display screen of the terminals T1 or T2 or the server 14, and sends the information to the master PC 25 which stores the information until it is transmitted through the modem 13 to the central computer 12.

The three data taps 22 are connected together in series in a "daisy chain" sequence. There is one data tap for each terminal $T_1$, $T_2$, etc. and for the server 14 in the POS system.

Figure 3:
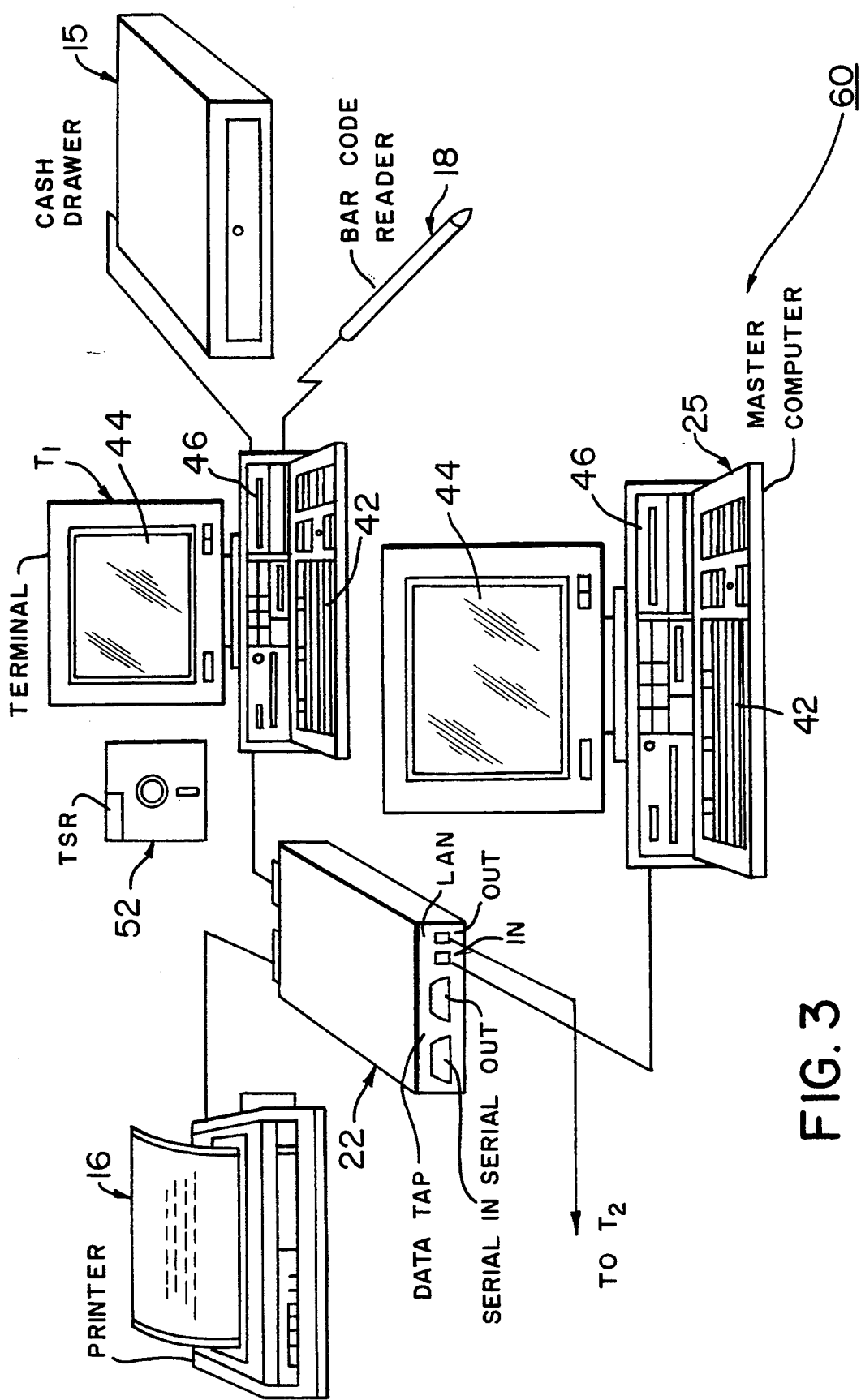
FIG. 3 is a schematic, partially perspective view of another embodiment of the point-of-sale system of the invention.

FIG. 3 is a partially perspective schematic view of an adapted POS system 60 which is the same as that used in Store No. 2 of FIG. 1, except that the terminal T2 and the server 14 are not shown, and only one data-tap 22 is used.

The server 14 and each terminal T1, T2, etc. is a separate personal computer whose software is not compatible with that of the central computer. The LAN adapter card 21 and modem 13 shown in Store No. 2 of FIG. 1 are inside the master unit 25 and are not visible in FIG. 3.

As shown in FIGS. 1 and 3, each respective data tap 22 is connected to the terminals T1, T2 and the server 14, and is further coupled through the LAN adapter 21 to the master computer 25. One of the data taps, for example, the data tap connected to terminal T1 is also connected to the printer 16. The data tap 22 is adapted to receive and temporarily store all data displayed on the display screen of the terminals T1, T2, and data to be printed on the printer 16. The captured data is thereafter supplied through the LAN adapter to the master computer.

A "TSR" program disc 52 is shown in FIG. 3. As it will be described in greater detail below, the TSR program is used in each terminal T1, T2, etc. to facilitate data selection and processing in accordance with the invention.

Applicants have taken advantage of the fact that, regardless of the brand of the computer, data which is sent to the display screen or display device such as the printer 16 consistently is in ASCII code. Therefore, the hardware of the data tap can be standardized so that one type of device can be used with a wide variety of computer hardware and software.

This is highly advantageous. It minimizes hardware and software costs and facilitates modification of existing POS systems to lower the cost of entry into the revenue-sharing plan. Also, the store employees need not be re-trained to use new software, because they can simply continue to use the software with which they are familiar. This minimizes any business interruption which might be caused by entry into the revenue-sharing plan.

INTEGRATED POS SYSTEM

Store No. 3 of FIG. 1 is an example of a store that has no computer equipment to start with. Since such a system has no incompatible software, compatible software can be used from the very start. However, since it might be a major expense to the store owner to purchase a prior point-of-sale system simply for the purpose of enrolling in the revenue-sharing plan, applicants have provided hardware with minimum cost and size so that the store owner's investment is kept to a minimum.

In particular, the system in Store No. 3 includes a master PC 25, a LAN adapter 27, a printer 16 and cash drawers 15 and 17. Also included are optional credit card readers 28 and 29, as well as bar code reader wands 18 and 19.

In accordance with a further aspect of the present invention, the POS system also includes two simple, low-cost data input "Small Footprint Terminals" ("SFT's") 23 and 24. The small footprint terminals will be described in greater detail below.

With the use of the small footprint terminals, if needed, and the advantageous software of the present invention, the store owner of Store No. 3 can install a system which will keep track of inventory, and all sales transactions, and also will automatically separate out the data for video record transactions and transmit it through a modem over a telephone line 32 to the central computer, all at a relatively modest cost.

Figure 2:
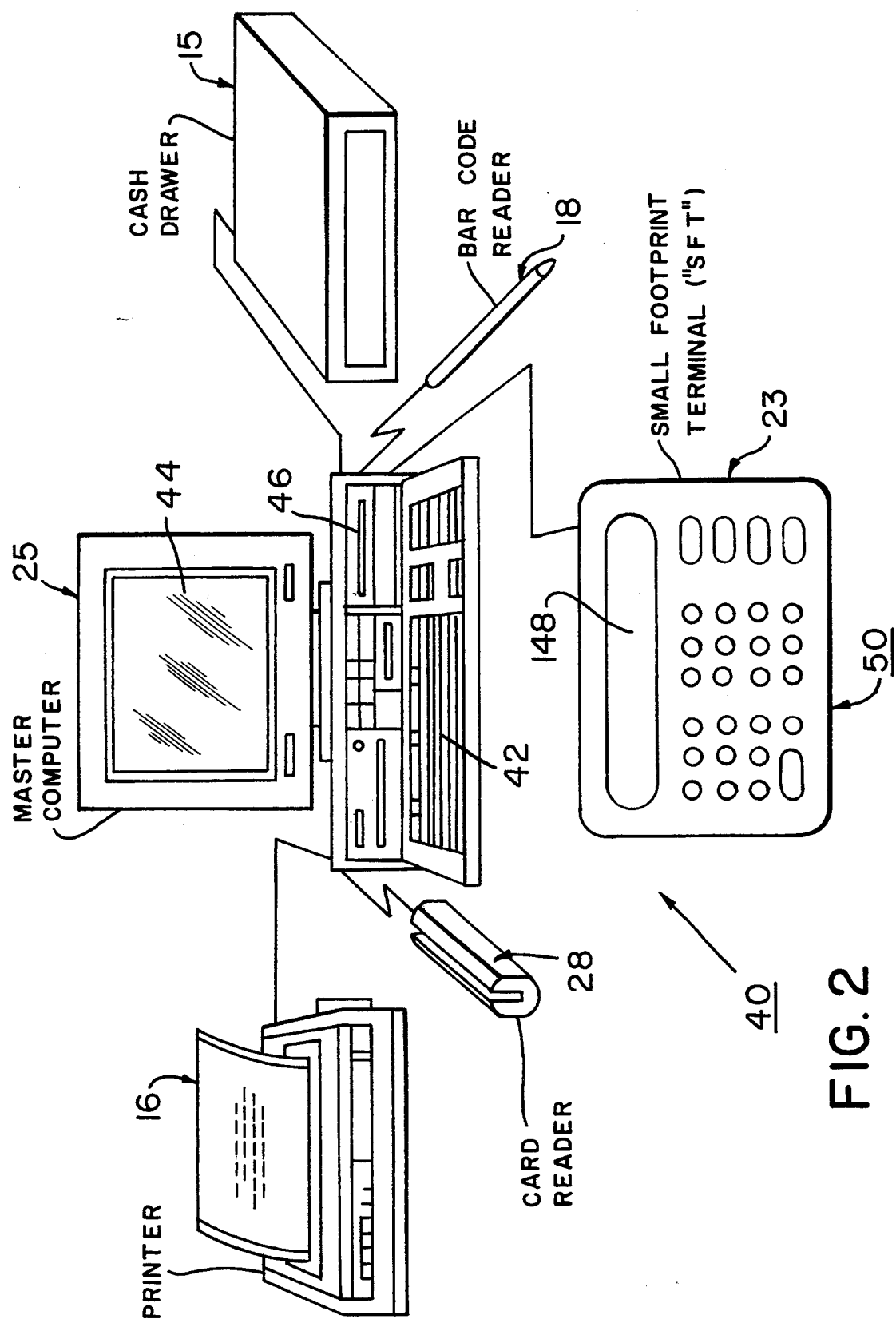
FIG. 2 is a schematic, partially perspective drawing of one embodiment of the point-of-sale system of the invention.

FIG. 2 is a partially perspective view showing an integrated POS system 40 like that used in Store No. 3 of FIG. 1, except that only one SFT terminal 23 is used instead of two.

The master computer 25 is a conventional personal computer such as one made by IBM, or an IBM compatible personal computer. It has a full keyboard 42, a video display screen 44, an internal hard-disc drive (not shown), and a floppy-disc drive whose input port is shown at 46.

The master computer 25 is programmed to be compatible with the central computer 12. It also is programmed to perform the data capture functions similar to those previously described with reference to the data tap 22.

In addition, certain other features are provided by the software, as it will be described below.

The printer 16 is a standard dot-matrix, ink-jet, laser or other printer connected to the printer port of the computer 25.

The cash drawer 15 is conventional, as is the credit card reader 28 and the bar-code reader 18.

The modem 26 and the LAN adapter card 27 of FIG. 1 are physically located inside the housing of computer 25 and are not visible in FIG. 2.

The small footprint terminal ("SFT") 23 is a compact, relatively inexpensive data entry terminal with a keypad 50 and a two line LCD display 148, each line having 40 characters. The SFT 23 will be described in greater detail below, and is shown enlarged and in its preferred form in FIG. 10.

Each of the master computer 25 and the SFT can be used at a separate check-out counter or station in the store. Another SFT can be added for each other station in the store.

Actually, the cash drawer 15, bar-code reader 18, card reader 28, the LAN adapter card, and the SFT 23 are not absolutely necessary to enable a store without a computer to participate in the revenue-sharing plan. The store only needs to acquire a master computer 25 with the compatible software described herein, and a modem and a printer.

As it is explained in the above-identified patents, most video tape cassettes bear information which is in both human-readable and bar-code form identifying the title of the work, a serial number for the cassette, etc. The bar-code reader 18 can be used to read this information into the computer 25 quickly. However, the store clerk can input the same information by means of the keyboard 42. Other products sold in the store also have similar identification information which is entered into the master computer 25. If one or more SFT terminals is included in the system, each such terminal can be used to enter the same information into the computer 25.

The computer 25 preferably is programmed to provide functions other than simply entering sales and rental data. For example, it can be used to order video tapes from an on-line revenue sharing catalog which may be periodically downloaded from the central computer 12. Additionally, the computer 25 provides information useful in operating the video tape rental store, including lists of video tape rentals by title, over-due video tapes, current video tape inventory, purchase order status, etc.

Other functions which can be performed by the master computer 25 are described in the above-identified patents.

The SFT 23 communicates with the master computer 25 by way of a local area network (LAN) which is implemented using the LAN adapter card 27 (FIG. 1). By way of this communication, the SFT 23 is able to receive price or other information from data bases stored in memory in the computer 25. Upon completion of each business transaction, the SFT 23 transmits the information relating to the transaction to the computer 25, which processes the information, and may cause the printer 16 to print an appropriate record of the transaction, such as an invoice.

The master computer 25 separates the data regarding rentals or sales of video records from other information, stores the video record data, and, at a predetermined time, transmits it to the central computer 12. The cassette identification numbers for revenue-sharing cassettes are known and can be identified by the central computer 12 to compute revenue shares. If preferred, only the revenue-sharing cassette rental information is collected, stored and transmitted to the central computer.

The computer 25 through the use of the modem 26 periodically calls up the central computer 12 and transmits accumulated transaction data for the store to the central computer over telephone lines 32, which may be one of the long distance systems previously described with reference to telephone lines 32. Alternately, the central computer may sequentially dial the telephone numbers assigned to each of the master computers in the separate stores in the system 10 at respective predetermined times, and cause the stored revenue-sharing data to be transmitted from each computer through its modem. Previously-stored orders placed by the store for revenue-sharing tapes also are transmitted to the central computer by this means.

The central computer 12 also transmits data to each master computer 25 in the system while it is connected to it. By this means, the central computer transmits updates to the catalog of available revenue-sharing properties, and other communications to each store. It also can transmit re-programming instructions to each local POS system.

Although the cash drawer, barcode reader, printer and credit card reader are connected by cables to the master computer 25, the SFT 23 also has receptacles in the rear panel (not shown) into which those devices could be connected, if it is more convenient to do so.

Each SFT terminal 23 is specially adapted for use as a POS terminal. Therefore, extraneous features needed in a general-purpose computer are not included. By this means, the cost of each SFT is minimized. This reduces the cost of the POS system in a store requiring more than one sale terminal.

ADAPTED POS SYSTEMS USING TYPICAL LAN

FIGS. 5 and 6 show other examples of adapted POS systems; that is, existing POS systems which are not compatible with the central computer 12 but have been adapted to be compatible without replacing the existing software.

FIG. 5 shows an existing POS system which includes a personal computer 202 used as a file server, work stations 208 and 210, and printers 212 and 213. Work stations 208 and 210 communicate with the server 202 by way of a conventional local area network package such as that sold under the trademark "NOVELL" by Novell, Inc, or "LANTASTIC", by Artisoft, Inc. Each package includes software and LAN adapter hardware. To adapt such a POS system to be compatible with the central computer 12, there is added a master computer 25, software programs, data taps 204, 205 and 206, the LAN adapter hardware and a modem (not shown) in the master computer.

As it is shown in FIG. 7, as well as FIG. 5, each of the data taps has a serial input port 230, a serial output port 232, and parallel ports 240 and 242 to allow the data tap to be connected to other equipment through either serial or parallel ports, as the equipment might require.

Each data tap also includes a LAN input connector 236 and a LAN output connector 238.

The master computer 25 is connected through cable 220 to the data tap 204 through LAN input terminal 236. Data tap 204 is connected through port 238 and cable 223 to the next data tap 205, which is connected to data tap 206 through cable 225. The three data taps thus are connected together in "daisy chain" fashion. This facilitates adding further data taps and workstations at the end of the "daisy chain", as the store and the POS system grow.

The server 202 is connected to the data tap 204 through the cable 221 and the parallel input port 240. Similarly, the printer 212 is connected to the data tap 204 through parallel port 242.

Each of the workstations 208 and 210 and the server 202 may be a full personal computer with a video display 246, a full keyboard 248, and may have a hard disc drive and/or a floppy disc drive 250. Each of these units 202, 208 and 210 has both serial and parallel ports and can be connected to the data tap through its serial input port 230. As an example, workstation 210 is connected to parallel port 240 of data tap 206 through cable 226.

Printer 213 is connected to parallel port 242 of data tap 206 through a cable 227.

The printer 212 is connected to serve both the server 202 and the first workstation 208. Printer 213 serves the second workstation 210. If desired, a separate printer can be provided for each data entry station.

It should be understood that the LAN adapter 21, modem 13, cash drawer, bar code readers, etc. shown in store No. 2 of FIG. 1 have been omitted from FIG. 5 for the sake of clarity. However, the POS system will include the adapter and modem, and usually will include the other items as well.

A program disc 214 is shown above each of the server 202 and the two workstations in FIG. 5 to indicate that a TSR program is stored in the unit and is used in the manner to be described below.

The POS system shown in FIG. 5 continues to use the software already used in the pre-existing LAN, and thus avoids the need to purchase new software and re-train employees to use the new software. The master computer 25 and data taps 204–206 operate independently, with compatible software, to gather and transmit the data needed for participation in the revenue-sharing plan.

ADAPTED POS SYSTEM USING UNIX

A POS system utilizing a UNIX operating system as illustrated in FIG. 6. The existing POS system includes a UNIX server 302, slave data entry terminals 304 and 306, and printers 308 and 310. To adapt such a POS system for use with the revenue-sharing system shown in FIG. 1, a master computer 25 and three data taps 312, 314 and 316 are utilized. The master computer 25 is connected to the data taps via cables 320, 325 and 327 in a "daisy chain" sequence like that shown in FIG. 5.

The connection of the terminals 304 and 306 to the server 302 is similar to that described above and shown in FIG. 5, except that, in the UNIX POS system, a separate cable 323 or 324 connects each slave terminal 304, 306 to the server. Accordingly, each data tap is connected between the server and one of the terminals, through cable 326 or 330.

When a printer is connected to a server or terminal, additional parallel connections are used. For example, printers 308 and 310 are respectively connected to the parallel ports of the data taps by cables 322 and 330 and from there to the server 302 and terminal 306 by way of the cables 321 and 329.

A program disc 303, which bears a program which is substantially similar to the TSR program 214 of FIG. 5, is loaded into the UNIX server 302 so as to enable the server to capture data displayed on the display screen of the server and/or sent to the printers and to supply such data to the respective data taps.

Each of the terminals 304 and 306 is a so-called "dumb" terminal; that is, it is a terminal having limited processing capabilities, and which depends on the server to process the data input at the terminal and define the display on the screen of the terminal.

The master computer 25 communicates with the data taps 312, 314, and 316 in a manner substantially identical to that previously described with reference to FIG. 5.

COMPUTER PROGRAMS

The computer programs used for data selection and storage are highly advantageous.

In general, a "teacher" program is used to create stored "templates" and "trapper" routines in each POS system.

The "templates" are routines for recognizing data appearing in predetermined locations on either a display screen or a printed invoice. The locations are set to match the specific formats used for invoices and/or screen displays in each store.

In an integrated system which has no data taps, the template(s) is or are stored in the master computer 25, (which also may be the only computer, in the smallest POS system).

In POS systems using data taps, the templates can be stored in the data taps, to save computer storage capacity, or in the master computer 25, or in the smart terminals of a system such as that shown in FIG. 5 or in the servers such as those shown in FIGS. 5 and 6.

The "trapper" routines which are created by use of the "teacher" program use the template(s) to separate and identify data to be stored and sent to the central computer 12. The "trapper" routines are stored in the master computer 25, and also may be stored in smart terminals or servers.

In the trapper routines, a unique combination of characters called "landmarks" is used to distinguish each type of display from the others. When a display is identified as one containing desired data, that data is selected by use of a template, stored in the master computer, and eventually uploaded to the central computer.

The "teacher" program is a program which is stored in the master computer, smart terminals and servers. It can be used by authorized personnel, such as an installer, to create the templates and trapper routines in a given POS system.

The templates for use with display screen data are created, in the manner to be discussed in detail below, by forming outlines or windows around specific areas of the screen, and enabling the detection of data when it appears in the windows.

If the data is selected from that which is transmitted to the printer to print business forms such as invoices, and if the data appears on the display screen on the computer 25, etc., in the same format as on the printed form, then the same technique can be used in establishing the template(s) as when screen data is used.

However, if the format of the data displayed on the screen does not match that of the printed data, a different technique is needed. For example, the invoice can be placed on a digitizer tablet, and the areas of the invoice from which data is selected can be outlined by the use of a digitizing pen.

Preferably, however, the data tap is programmed to have a "pass-through" mode in which data, for example, invoice data, is simply passed through to the master computer and stored on disc. Then the data for a typical invoice is put in the location required by the invoice, and pased through to the master computer, recalled, and displayed on a terminal screen. The data capture areas then are set to cover the areas occupied by the displayed data.

In either case, regardless of whether screen data or printer data is analyzed, the trapper program works in substantially the same way to detect and select data to send to the central computer 12.

The trapper and teacher routines are "terminate and stay resident" (TSR) routines; that is, routines which are able to run in a computer at the same time another portion of the main program is being executed.

PROGRAM FLOW CHARTS

The trapper and teacher programs will now be more fully described with reference to FIGS. 4A, 4B, 4C-1, 4C-2, 4D-1 and 4D-2. In this description, as an example, it is assumed that the programs are used in the terminal T1 of store no. 2 of FIG. 1.

"TRAPPER" PROGRAM

Figure 4A:
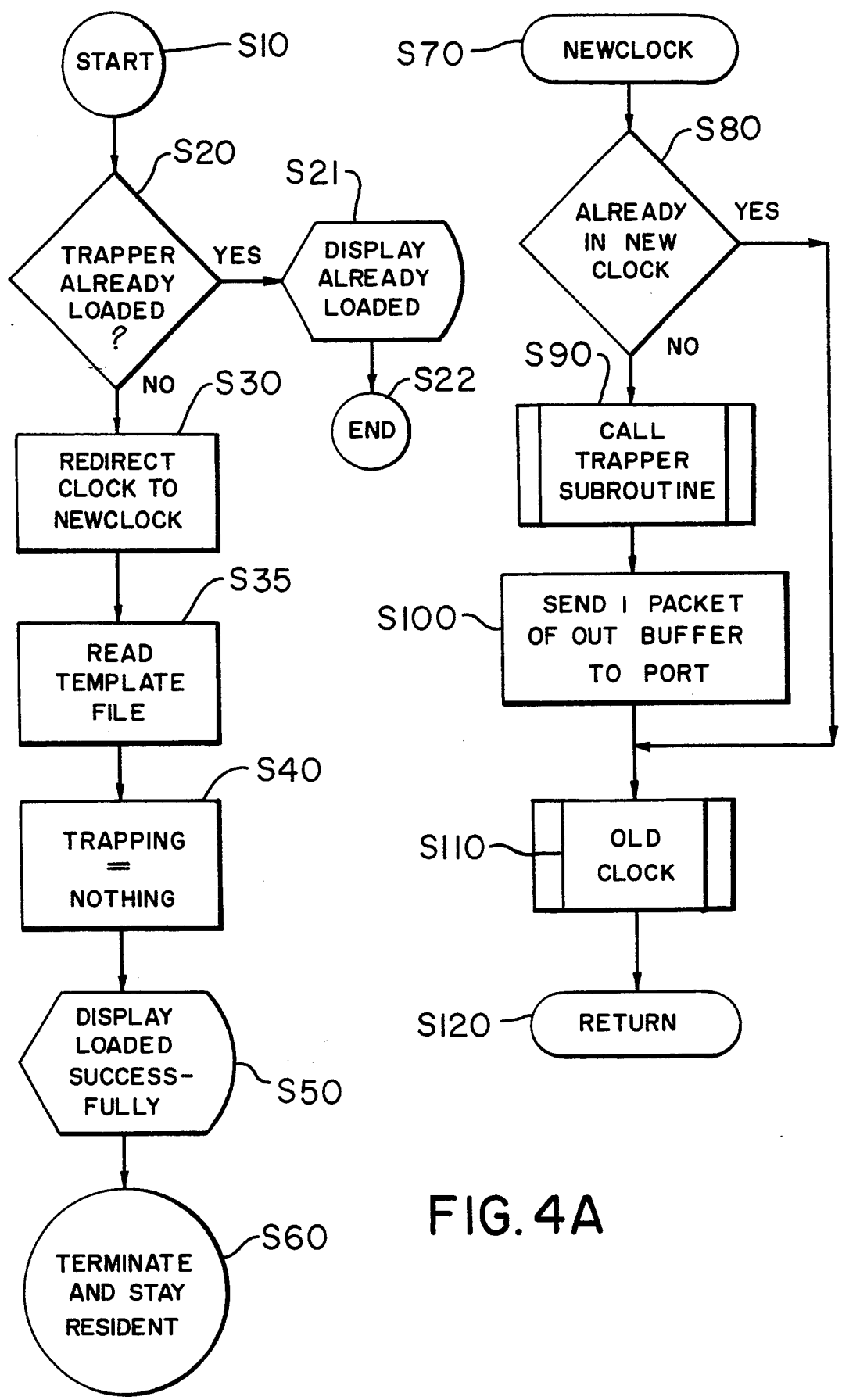

The trapper program is initiated at step S10 of FIG. 4A.

Processing then proceeds to step S20 in which a determination is made as to whether the trapper program has already been loaded. This determination prevents multiple copies of the trapper program from being executed. That is, if the trapper program has already been loaded, as indicated by a "Yes" at step S20, an indication representing that the trapper program has already been loaded is displayed and further processing is terminated, as indicated by steps S21 and S22, respectively.

If, on the other hand, the trapper program has not already been loaded, as indicated by a No at step S20, processing proceeds to step S30. At step S30, processing associated with the existing or "old" clock subroutine is redirected so as to include processing of an additional or "new" clock subroutine. This new clock subroutine is initiated by a clock interrupt signal which typically occurs at a rate of 18 times per second, and will be more fully described later. Processing then proceeds to step S35.

At step S35, the template file for the trapper program is read. The template file resides on disc in the terminal and contains a template which previously was created by use of the teacher program, as it will be described below.

At step S40, the status of the trapping process is set. At this time, data is not being trapped. Flags may be utilized for indicating the trapping status. For example, a "0" flag may be set at step S40 to indicate a "trapping nothing" status. Processing then proceeds to step S50.

At step S50, an indication that the trapper program has been properly loaded is supplied to the display screen of the terminal T1 so as to notify the operator. Thereafter, the trapper program is placed in a "terminate and stay resident" (TSR) mode as indicated in step S60.

Upon the occurrence of a clock interrupt signal, processing of the new clock subroutine is initiated in step S70 and then proceeds to step S80. At step S80, a determination is made as to whether the new clock or old clock subroutine is currently being executed. If the determination at step S80 is affirmative, processing proceeds to step S110. At step S110, the processing returns to the old clock subroutine, so that the normal processing of the application software is continued.

If, on the other hand, the new clock subroutine is not currently being executed, as indicated by a "No" at step S80, then processing proceeds to step S90. At step S90, the "trapper" subroutine is executed. The trapper subroutine of step S90 is shown in detail in FIG. 4B.

Figure 4B:
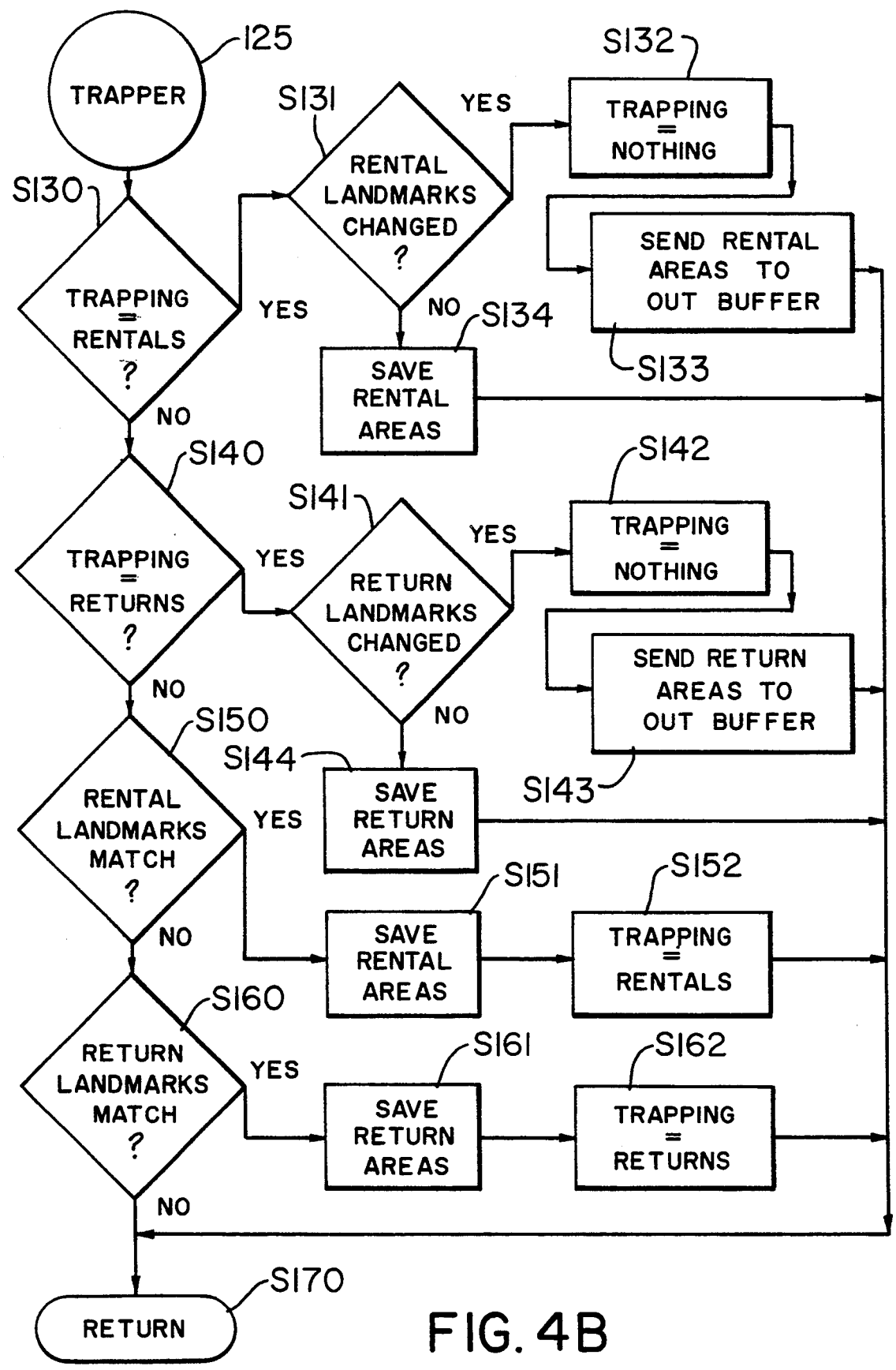

Referring now to FIG. 4B, the trapper subroutine starts at 125 and proceeds to step S130, in which a flag is detected, if it is present, indicating that video cassette rental data was being selected or "trapped" during the previous interrupt cycle. If the determination in step S130 is affirmative, processing proceeds to a series of steps S131–S134 for determining when the data on the terminal screen has changed, and for saving cassette rental data.

At step S131, a determination is made as to whether the previously selected "landmarks" have changed. "Landmarks" are selected certain portions of the data displayed on the terminal screen during the processing of video cassette rentals. They are unique in terms of their content and/or their location on the screen. Any screen having these marks is identified as a screen containing video cassette rental data.

If the recognition marks have changed, as indicated by a Yes at step S131, processing proceeds to step S132. At step S132, a "trapping nothing" flag is set for the next interrupt cycle. This indicates that the display has changed and that the next display must be tested to see if it has cassette rental or return data.

When the landmarks have changed, this indicates that the screen being displayed has changed, and the next screen must be tested to determine whether or not it is one which has rental or return data. After step S132, processing proceeds to step S133, in which the data saved from the areas of the display selected by the template is sent to an output buffer. Thereafter, processing proceeds to step S170, wherein processing exits the trapper subroutine and returns to step S100 in FIG. 4A, where one packet of data is sent to the output port of the data tap or computer in which the program is operating.

If, however, the landmarks have not changed, as indicated by a No at step S131, processing proceeds to step S134. At step S134, the rental information which has been trapped is saved, updated during subsequent interrupt cycles, and ultimately sent to the output buffer at the end of the display. Thereafter, processing returns to step S100 to wait for the next interrupt cycle.

If the determination in step S130 is negative, processing proceeds to step S140. At step S140, a determination is made as to whether the selected information pertains to the return of video cassettes to the store after a rental. If the determination in step S140 is affirmative, processing proceeds to steps S141–S144, which are the same as steps S131–S134 except that they are performed for return data rather than rental data.

If the determination in step S140 is negative, meaning that neither a "trapping returns" or "trapping rentals" flag has been set, processing proceeds to step S150. At step S150, a determination is made as to whether landmarks have been detected which match. This comprises the first identification of the display as one having video cassette rental data. If there is such a match, as indicated by a Yes at step S150, then rental data is trapped and stored in the memory at step S151. Thereafter, at step S152, a "trapping rentals" flag is set to indicate that video cassette rental data is being trapped, and the process returns to step S100 in FIG. 4A to await the next interrupt cycle.

If, on the other hand, there is not a match of video cassette rental landmarks, as indicated by a No at step S150, then processing proceeds to step S160. At step S160, a determination is made as to whether cassette return landmarks have been detected. If there is such a match, as indicated by a Yes at step S160, then processing proceeds to steps S161 and S162, whereupon processing identical to that of steps S151 and S152, respectively, is performed, except that a "trapping returns" flag is set up and return data is saved.

If there is not a match of video cassette return landmarks, as indicated by a No at step S160, then processing returns to step S100 in FIG. 4A.

The trapper routines are repeated once for every clock interrupt signal, which has a frequency of 18 interrupt cycles per second.

When each new display is created, it has neither a "trapping rentals" flag nor a "trapping returns" flag. The display is first identified as one containing data to be saved in step S150 or S160. Thereafter, during each subsequent interrupt, since the status flag has been set at step S152 or S162, the determination of step S130 or S140 is affirmative. As a result, processing proceeds to step S131 or S141 so as to determine if the landmarks have changed. If the landmarks have not changed, thereby indicating that the same screen is still being displayed, video cassette rental information continues to be trapped and saved.

The next time in which the trapper subroutine is executed, since the status flag set in step S152 or S162 has not changed, the determination at step S130 or S141 is again affirmative. Processing then proceeds to step S131 or S141. At this point, assume that the display screen has changed. The determination at step S131 or S141 is then affirmative. Since the screen has changed, video cassette rental information is no longer being trapped and, as such, the status flag is set accordingly at step S132 or S142. All of the trapped video cassette transaction information, which had been saved at steps S151, S161, S144 and S134, is supplied to the output data buffer of the terminal at step S133. Processing then proceeds to step S170.

Referring again to FIG. 4A, the data stored in the output data buffer at steps S133 and S143 at the termination of a screen is supplied by way of the output parallel printer port of the terminal T1 to the data tap 22, or are sent directly to storage in the master computer 25, in a system having no data tap. Since only a certain limited amount of data can be transmitted during each interrupt cycle, one packet of data is transmitted during each cycle until all of the data has been transmitted. By transmitting the data in this manner, a slowdown of the POS processing is not noticeable. The data waiting to be transmitted is stored in memory, for example, the RAM, of terminal T1.

Prior to transmitting this data, a unique character or characters are added at the beginning and the end of the data stream. These characters provide a means for the data tap 22 to distinguish between data which is trapped as a result of the trapper program from data to be printed by the printer 16. That is, upon detecting these unique characters, the data tap is alerted that the data identified by the unique characters is trapped data to be sent to the master computer, and is not to be printed.

After step S100, processing proceeds to steps S110 and S120 as previously described.

"TEACHER" PROGRAM

Figures 1, 4C:
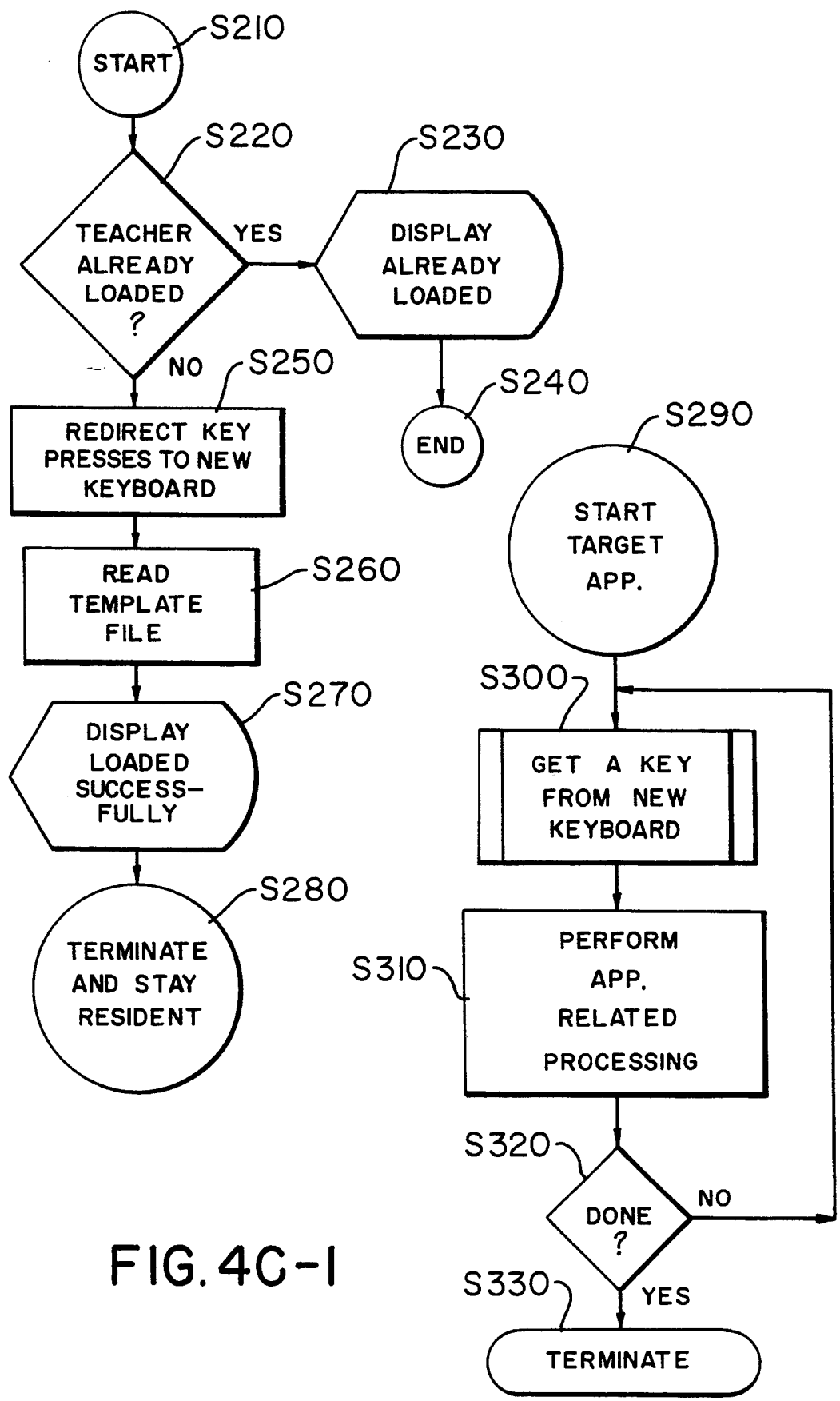
Figures 2, 4C:
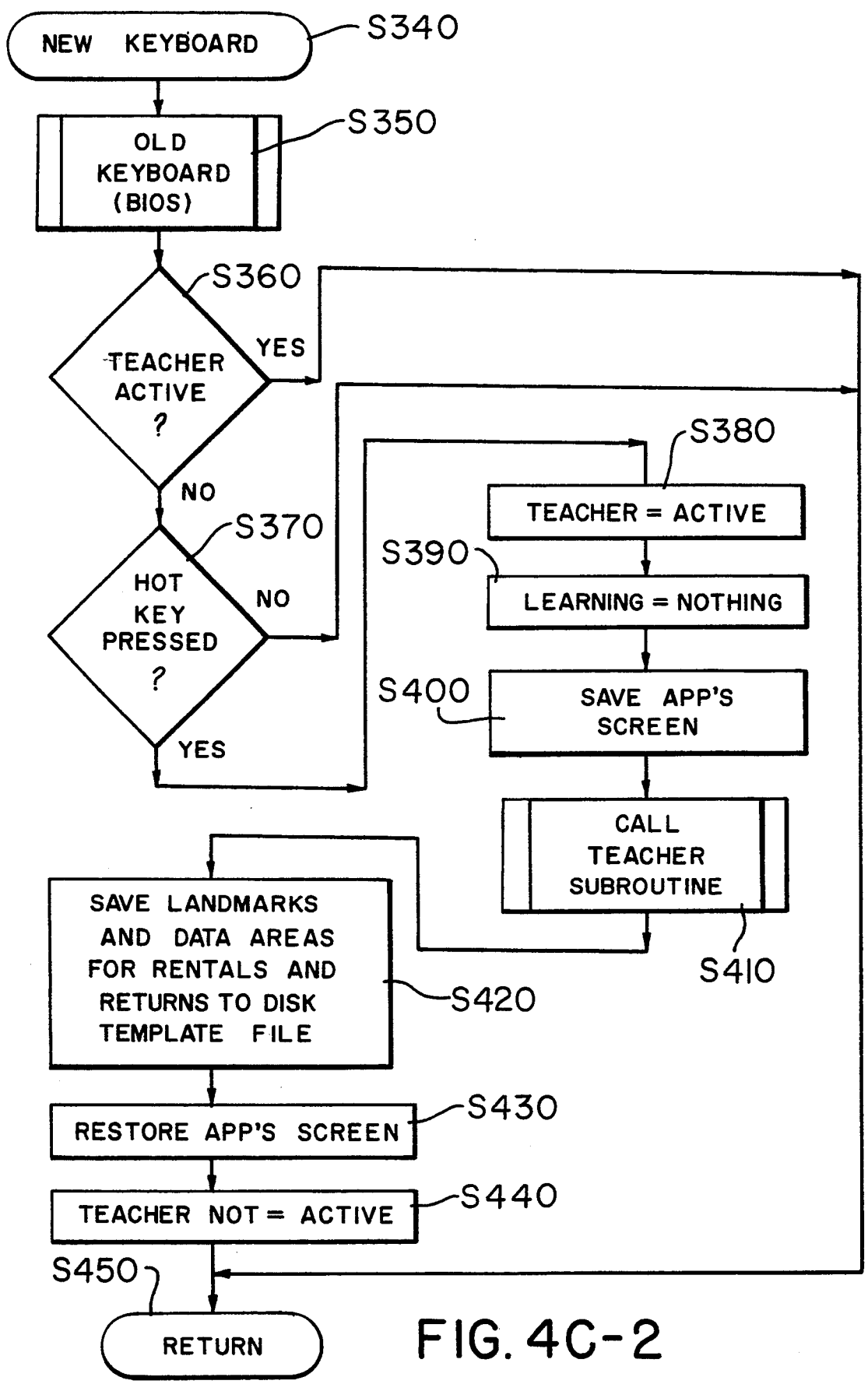

Referring now to FIGS. 4C-1 and 4C-2, the "Teacher" program is initiated at step S210. Thereafter, processing proceeds to the determination step S220. The processing performed in steps S220, S230 and S240 is substantially similar to that of steps S20, S21 and S22, respectively, and therefore will not be further described.

If the teacher program has not already been loaded, as indicated by a No at step S220, processing proceeds to step S250 in which the signals produced by pressing the keys on the keyboard of the terminal T1 are modified or "redirected" in a "new keyboard" routine.

Subsequently, in step S260 a template file is loaded from disc into memory. This template file may be a default file as, for example, represented by the windows located on the right side of screen No. 4. Alternatively, the template file may be one that had been previously modified, and may be similar to that represented by the windows shown in screen No. 6.

After step S260, in step S270, an indication that the teacher program has been loaded successfully is displayed. Thereafter, the program is placed in a terminate and stay resident mode (TSR) at step S280.

Step S290 is initiated to bring the target application onto the screen. Because teacher is not active, the new keyboard, as in the step S300 routine, executes the old keyboard function. In step S310, the application responds in a normal manner to a key press. In step S320, a determination is made as to whether the key pressed terminates the application. If not, the loop formed of steps S300, S310 and S320 are repeated as the application responds to each key press. Once the desired screen is brought to the display, so-called "Hot Keys" are pressed and the teacher is activated.

The "new keyboard" portion of the teacher program utilized for creating the trapper template will now be described.

Referring now to FIG. 4C-2, the new keyboard routine is initiated by a key press. As previously mentioned, while the teacher is not active and prior to a hot key press, the old keyboard routine is executed in step S350 and processing then proceeds through steps S360 and S370 to step S450, which completes the routine. Once the hot key is pressed, while the teacher is inactive, step S350 executes the old keyboard routine. Processing then proceeds through step S360 to step S370, whereupon the hot key press is detected.

At step S380, a status indication or flag is set indicating that the teacher program is active. Thereafter, processing proceeds to step S390, in which an initial status indication or flag is set indicating that neither landmarks nor data areas are currently being set or learned. Processing then proceeds to step S400, in which the currently displayed application screen is saved in a memory of the terminal T1. Thereafter, processing proceeds to the teacher subroutine of step S410.

Figures 1, 4D:
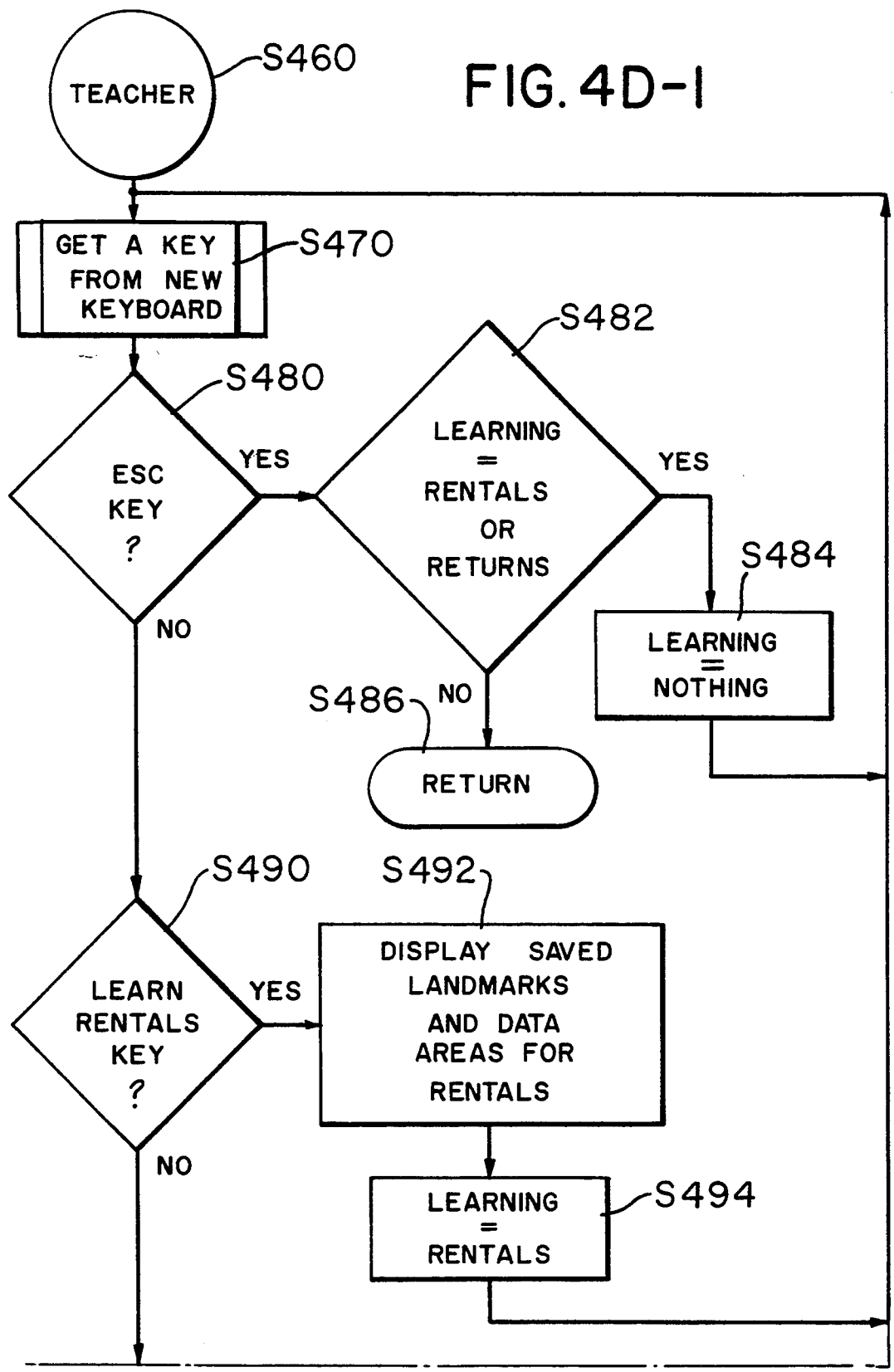
Figures 2, 4D:
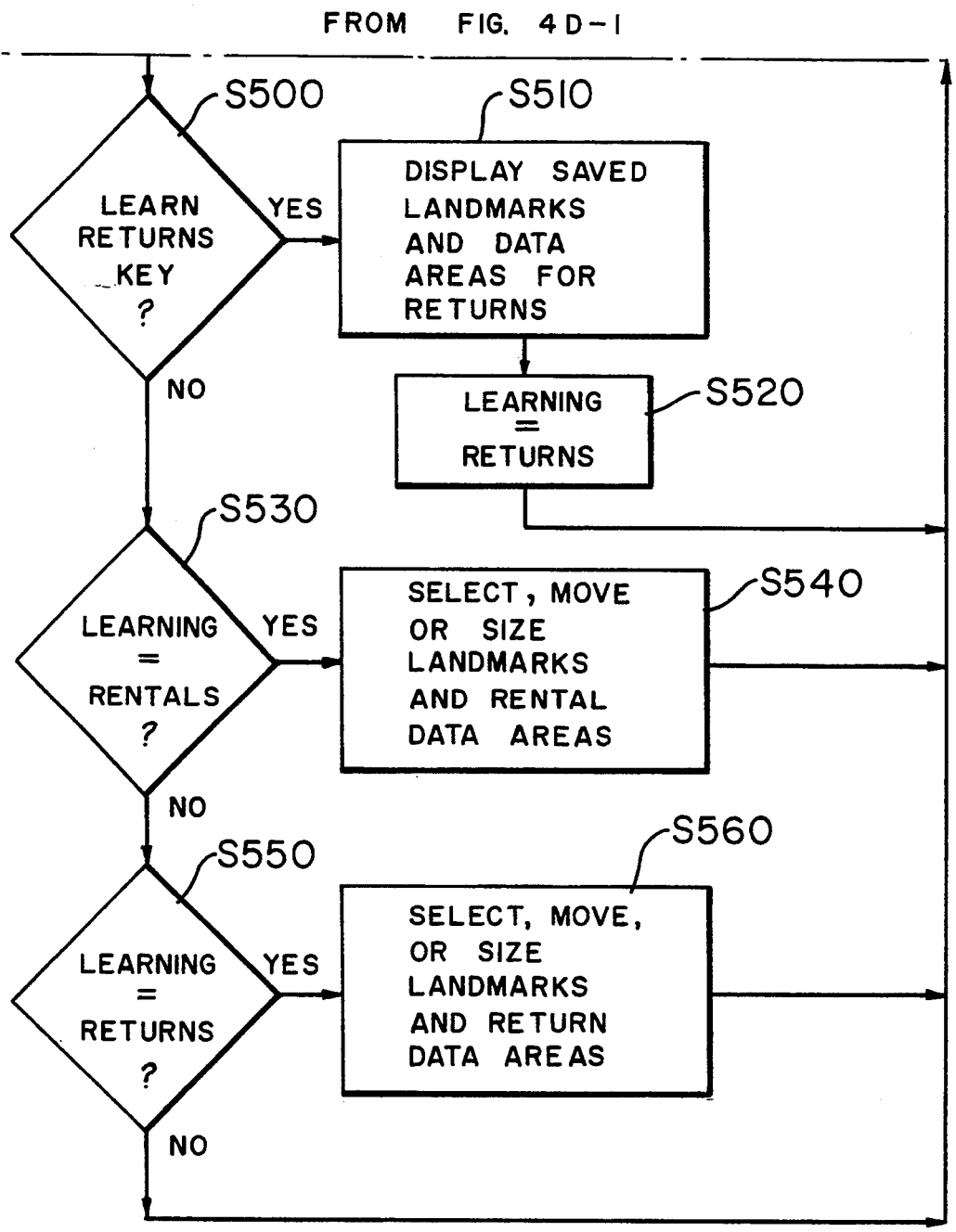

The teacher subroutine of step 410 is expanded as shown in FIG. 4D.

Referring now to FIGS. 4D-1 and 4D-2, the processing of the teacher subroutine starts at step S460 and proceeds to step S470. At step S470, the installer may select a key from the displayed main menu. As an example, in the preferred embodiment, selecting the "Alt" and "1" keys initiates processing of the trapper template for the video cassette rental landmarks and data, whereas selecting the "Alt" and "2" keys initiates processing of the trapper template for the video cassette return landmarks and information data. After selection of the key or keys in step S470, processing proceeds to step S480.

At step S480, a determination is made as to whether the escape key has been pressed by the installer. If the escape key has been pressed, as indicated by a Yes at step S480, processing proceeds to step S482.

At step S482, a determination is made as to whether areas for either rental or return landmarks and data are being set or learned. If the determination in step S482 is affirmative, processing proceeds to step S484. At step S484, the status indication or flag is set to indicate that neither rental or return information is being learned. Thereafter, processing returns to step S470. If, however, the determination at step S482 is negative, processing proceeds to step S486, whereupon the teacher subroutine is exited and processing is returned to step S420. Thus, after the learning processing has been initiated as described later, the escape key needs to be pressed twice in order to exit the teacher subroutine.

If, on the other hand, the escape key has not been pressed, as indicated by a No at the Step S480, processing proceeds to step S490. At step S490, a determination is made as to whether the key(s) selected in step S470 initiates learning of the video cassette rental landmarks and data information. That is, in the preferred embodiment, were the "Alt" and "1" keys selected in step S470.

As an example, assume that the "Alt" and "1" keys were selected in step S470. As a result, the determination in step S490 is affirmative. Processing then proceeds to step S492 in which areas to be used for landmarks and data information are displayed as well as functional information used for identifying the landmarks and data information. Processing then proceeds to step S494, in which the status indication or flag is set to indicate that rental landmark or data information areas are being set. Thereafter, processing returns to step S470, for selection of key from those identified in the sub-menu.

Processing then proceeds through steps S470 and S480 to step S490. At step S490, since a key from the sub-menu was selected in step S470 and not the learning rental or "ALT" and "1" keys, processing proceeds to step S500. Similarly, processing proceeds through step S500 to step S530.

At step S530, a determination is made as to whether the learning of rental landmark and data information areas is currently being performed. If the determination in step S530 is affirmative, processing proceeds to step S540. In this situation, since the flag was set in step S494 indicating that rental learning is being performed, processing proceeds to step S540. At step S540, the landmark and data areas are selected. These areas may be selected by using, for example, cursor locating or arrow keys ( ↑, ←, ↓, →) to move shaded areas to the desired positions, thereby forming a rental template. After completing this rental template, processing returns to step S470.

Since the rental template is completed, processing proceeds from step S470 to step S480, whereupon the escape key is selected. Thereafter, processing proceeds to step S482. Since the flag set in step S494 still indicates that rental landmark and data information areas are being learned, processing proceeds to step S484.

At step S484, the flag is reset to indicate that rental learning is no longer being performed. Thereafter, processing returns through step S470 to step S480. Upon pressing the escape key again, processing now proceeds through step S482 to step S486, thereby exiting the teacher subroutine.

If landmark and data information areas pertaining to video cassette returns had been desired, the "Alt" and "2" keys would have been selected initially at step S470. In this situation, the processing of steps S500, S510, S520, S550 and S560 would have been performed. Since the processing performed in these steps is substantially the same as that performed in steps S490, S492, S494, S530 and S540, respectively, they will not be described further.

Referring again to FIG. 4C-2, after the teacher subroutine ends, as indicated at S420, the landmark and data information areas are saved in a file entitled the "template file" in memory. Then, as indicated at S430, the application screen saved at step S400 is displayed.

Processing then proceeds to step S440 where the flag initially set in step S380 is changed to indicate that the subroutine is no longer active. Processing is then returned to the application software at step S450.

If the new keyboard is called while the teacher is active, processing proceeds through steps S340, S350 and S360 to completion at step S450.

SAMPLE DISPLAY SCREENS

The following description illustrates the operation of the teacher program. Sample display screens are reproduced for use in the description. The screens were produced using a data format produced by an existing POS program. This illustrates how the invention easily can be used with a variety of existing video retail store software packages.

In the interest of brevity, the following description will be limited to the use of the teacher program to set landmark and data capture areas for video record rentals only, with the understanding that the teacher program also can be used for video record returns and sales, etc. Similarly, the teacher program may also be used in the rentals, returns and sales of non-video record items.

Upon loading the teacher program into the memory of the terminal T1 or other computer, display shown in Screen 1 illustrated in FIG. 4E appears on the CRT display.

Next, a display for use in renting video records is selected, and screen 2 illustrated in FIG. 4F appears.

The information appearing on screen No. 2 illustrated in FIG. 4F will now be described, beginning at the top of the screen and proceeding to the bottom.

The top line of Screen No. 2 includes an invoice number for the rental transaction, the time and date, and the term "CAP". The invoice number displayed in this example is No. 1. The time and date represent the time and date of transaction. The "CAP" term indicates the lock function of the keyboard.

The second line from the top of Screen 2 includes identification of the cashier/drawer, the customer file number and "items out."

The cashier/drawer entry identifies the cashier operating the terminal or workstation or the cash/drawer being used with the terminal or workstation.

The customer file number allows tracking of customers between different stores of the same chain.

The term "items out" indicates the current number of video cassettes and video players which this customer has not as yet returned.

The third line from the top of Screen 2 includes a sales person identification number, customer identification, and total rentals.

The sales person identification is entered into the terminal or workstation by the sales person and stored in memory prior to initiating any business transactions. The customer identification may be in the form of a number, and the customer's name and/or phone number. In this situation, the customer identification is "1 J. Smith".

The total rentals (TOT RENTS) indicates the number of rentals which this customer has rented over a predetermined time period. In this situation, this customer has previously rented one video cassette during the last week.

The fourth line of Screen 2 includes the term "DAYS OUT", "MEMBERSHIP FEE" and "CREDITS DUE".

"DAYS OUT" refers to the rental period and is typically set by the store owner. In this particular example, the store owner has set the standard time period for the rental of a video cassette to be one day.

The "MEMBERSHIP FEE" term indicates the total expenditure paid by the customer for his or her membership in the video store club. In this example, since the customer is not a member (as indicated by the pricing type "O") the customer has not paid anything towards a membership fee.

The "CREDITS DUE" term refers to a credit in terms of a number of free rentals which may be owed to the customer. In the example shown, the customer is not owed anything.

The fifth line from the top of Screen 2 includes the terms "DAYS CHARGE", "MEMB PRICING TYPE" and "ITEM NUMBER".

The "DAYS CHARGED" term refers to the number of days charged to the customer for the video cassette rental. As with the previously described "DAYS OUT" term, the charge is set by the video store owner. In this example, since the video cassette is rented for one day, the number of days charged for also is 1. If, however, the customer were to rent a video cassette on a Saturday evening and the store were to be closed on the next day, a Sunday, the "days out" term would indicate 2, but the "days charge" term would still be 1.

The "MEMB PRICING TYPE" term stands for "membership pricing type". This indicates one of four pricing classifications in which the customer has been placed. As an example, the store owner may provide discount memberships to senior citizens or full-time students, and so forth.

The ITEM NUMBER term is the actual identification number of the item being rented or purchased. As previously described, this item may be entered by use of the bar code wand 18 to read it off of the tape cassette being rented, or by use of the keyboard of the terminal or workstation. While the item number is being entered, the number appears on the line to the right of the colon (:). Upon entering a valid item number, the number to the right of the colon is omitted and the number is placed in parenthesis as shown to the left of the colon.

The sixth line from the top of Screen 2 includes the headings "NO.", "DESCRIPTION", "RSCF", "DAY O", "DAY C", "CHARGE", "DUE DATE", "DUE TM" and "A/P".

"NO" is a number assigned to the item which is being sold or rented, and corresponds to the above-described item number. More specifically, upon entering the item number from the fifth line, the number corresponding to this item number, which is stored in the database of the master computer, is recalled and displayed. In this example, the number in the master computer's database corresponding to the entered item number of the fifth line is 1001.

The "Description" column provides a description of the item being rented or sold. In this situation the item is a movie, as indicated by the term "MOV", and is entitled *Gone With The Wind*.

The RSCF column refers to the type of the transaction. That is, "R" indicates a rental, "S" indicates a sale, "C" indicates a credit and "F" indicates a free transaction, such as for a free replacement.

The "Day O" column indicates the number of days which this movie is rented for, which, in this example is one day.

The "Day C" column indicates the number of days for which the customer is to be charged for this rental which in this situation is one day.

The "Charge" column indicates the cost of the rental.

The "Due Date", "Due Time" (TM) and A/P columns indicate the day and time in which the video cassette is to be returned. In this example, the cassette is to be returned no later than 4:00 pm on Sep. 24, 1991.

The eighth line of Screen 2 includes membership pricing type (MEM TYP) and account balance (ACT BAL).

The membership pricing type is identical to that displayed on the fifth line and is merely redisplayed at this location.

The account balance indicates the outstanding balance which the customer owes. In the example shown, the balance is 0.

The ninth line of Screen 2 includes total rentals ("TOTAL RENT"), membership fee ("MEMB FEE") and sub-total.

The total rentals is the amount charged for all video cassette rentals for the current transaction, which in this example is $7.00.

The membership fee indicates the amount towards a membership which the customer is currently paying. In this situation, the customer is not paying anything towards his or her membership fee.

The sub-total indicates the amount of total rentals, sales and miscellaneous charges prior to any applicable sales tax.

The ninth line from the top of Screen 2 includes "TOTAL SALE," "SALES TAX" and "NOT-RESERVED".

The "TOTAL SALE" indicates the total amount of video cassette sales, and thus lists sales separately from rentals. The sales tax entry is self-explanatory.

The "NOT RESERVED" message appears indicating that the cassette being rented was not previously reserved by the customer. If the cassette is rented at the same time as it was reserved for, and if the customer renting the cassette is the one who reserved it, a "MATCH" message will appear. If the same customer reserved it for a different time, a "SEMI-MATCH" message appears.

The eleventh line of Screen 2 lists miscellaneous charges ("MISC CHRGS"), "TOTAL" and [Esc]=END.

The miscellaneous charges indicate the non-video cassette items such as candy, cigarettes, etc. which have been purchased.

"TOTAL" is the grand total of the current transaction, including tax.

The [Esc]=END prompt reminds the operator that upon completing the transaction the "ESC" key is to be pressed to end the transaction.

The last two lines on Screen 2 list the function keys F1 through F10 and their respective functions.

F1 and F2 move the cursor to be moved in an upwardly or downwardly direction, respectively, inside the area of the screen dedicated to the transaction information. That is, these keys, in combination with the keyboard, allow the operator to edit a line.

Function keys F3 and F4 may be used by the operator to enter a Days Out and a Days Charge which may be different from that set by the store owner.

Key F5 informs the terminal or workstation that a check-in or video cassette return is to be entered. By pressing function key F5, the screen is changed to a screen for handling the returns of video cassettes.

The customer key F6 is used to modify the customer number/name or phone number of the third line.

The total key F7 is used to calculate a re-total. The miscellaneous or function key F8 is used to enter price information for miscellaneous items, such as popcorn, etc.

Pressing function key F9 allows the cursor to move to the portion of the screen containing the No., description, RSCF, Day O, etc., terms.

Upon pressing the function key F10 the transaction currently displayed on the screen is aborted.

In accordance with the present invention, upon pressing the "hot keys" on the keyboard, that is, the "Alt" and the left "shift" keys, the main menu of the teacher program is displayed in the shaded area at the bottom of the display as shown in Screen 3 illustrated in FIG. 4G. The main menu allows the installer to select processing for either "rentals" or "returns".

By pressing the "Alt" and "1" keys, the operator displays the sub-menu of the teacher program for rentals in the shaded area at the bottom of the display as shown in Screen 4 illustrated in FIG. 4H.

The sub-menu in Screen 4 includes ten terms which are used for identifying the landmarks and the data capture areas.

Terms LM1, LM2 and LM3 are used for identifying three landmarks. Similarly, the next seven terms are used to identify rental transaction data, that is, the invoice No. ("Inv"), customer ("Cust"), type of transaction ("Type"), the number of days desired to rent the video cassette ("Qty"), volume identification or the number of the volume ("Vo Id") of the item being rented or sold, title of the video cassette ("Title") and the price or charge for the rental or sale ("Price").

Also displayed on the right side of the screen is a row of 10 rectangular shaded areas, each of which corresponds to one of the 10 terms displayed in the sub-menu. The top-most shaded area is reserved for landmark No. 1, the next shaded area below is for landmark No. 2, and so forth, down to the bottom shaded area which is for the price data. The operator can move the shaded areas and change their sizes to cover the desired landmark and information areas as described below with reference to Screens 5 and 6.

Any of the terms in the submenu in Screen 4 can be selected by pressing "ALT" plus one of the keys 0 to 9 on the keyboard. When this is done, Screen 5 illustrated in FIG. 4I appears.

Each of the shaded areas on the right side of the screen can be moved to a desired location to cover the area where certain data appears. The shaded areas can be moved by using the cursor or arrow keys (↑, ←, ↓, →). The size of each area can be modified by using the "Shift" key together with the desired arrow key.

The technology for creating, moving and enlarging these areas is well known in the art and will not be described here. For example, such technology is utilized in a number of word processing programs which are commercially available.

As shown in Screen 5, the areas containing the "INVOICE NUMBER", "CASHR/DRAWER" and "NO. DESCRIPTION" have been selected as the three landmark areas. This has been done by moving the three uppermost shaded areas in Screen 4 to the left, as shown in Screen 5.

These three areas were selected because collectively they contain data which is unique to the rental screen in terms of content and location. Therefore, later, during use of the "trapper program", if each of the terms "INVOICE NUMBER", "CASHR/DRAWER" and "NO. DESCRIPTION" is detected in these landmark areas, then the screen being displayed is identified as a rental screen from which data is to be saved for transmission to the central computer 12.

Screen 6 illustrated in FIG. 4J is the same as Screen 5, except that the data capture areas have been fully defined.

The manipulative steps involved are illustrated by the following example.

The operator presses the "Alt" and the "4" keys to activate the fourth shaded area from the top in the right portion of Screen 4. Then, this capture area is moved by use of the arrow keys so as to cover the "1" following the "INVOICE NUMBER" term on the top line of the screen. This area then is reduced in size, by using the "SHIFT" and the arrow keys, as it has been described above, so as to cover only the area reserved for the invoice numbers.

Similarly, the other data capture areas are moved and re-shaped to cover the customer number, the type or RSCF column, the quantity or days out column, the volume identification No. column (i.e., the column entitled "NO."), and the title and the price or charge column.

Later, during operation of the "trapper" program, the data in these seven data captures areas is saved for later transmission to the central computer 12.

The pattern of data capture areas shown in Screen 6 is referred to in this patent application as a "template".

Upon completing the template for the video cassette rentals, the operator presses the ESCAPE key. As a result, the teacher program exits from the sub-menu and returns to the main menu display shown in Screen 3 above.

Upon pressing the ESCAPE key a second time, the operator restores the rental screen normally displayed by the application software, Screen 2 which is shown above.

The teacher program can be used in the same manner to set or adjust the landmark and data capture areas for other screens, such as for returns, etc.

DATA TAP

FIG. 7 is a block diagram of the data tap 22. The data tap includes a microcontroller 102, a memory segmentation and selection circuit 104, a programmable serial I/O circuit 112, a parallel I/O circuit 116, a local area network (LAN) I/O circuit 120 and a data, address and control bus 110.

The data tap 22 is connected to the master computer 25 by way of the LAN I/O circuit 120 and a cable as shown above in FIG. 5 or FIG. 6, etc. (not shown in FIG. 7). This allows communication between the master computer and the data tap. In a preferred embodiment, both transmitted and received communications are differentially driven by utilizing RS-422 or RS-485 interfaces. The use of these interfaces allows effective communications over relatively large distances. That is, an RS-422 or RS-485 interface allows effective communication up to a length of approximately 5,000 feet, whereas a standard RS-232 interface typically restricts the effective length of a communication path to only about 50 feet. The LAN I/O circuit 120 is preferably configured so as to allow "daisy chain" connections between multiple terminals or work stations, as described above, and as it will be described in greater detail below.

The parallel I/O circuit 116 includes two parallel ports 240, 242 in which one of the ports 242 is adapted to function in a bi-directional manner as either an input or an output port. This bi-directional port 242 is connected to the printer, 212 as shown in FIG. 5. The other port 240 may be connected to a terminal, a server computer or a workstation, also as shown in FIG. 5.

The programmable serial I/O circuit 112 contains a dual universal asynchronous receiver transmitter (Dual UART) integrated circuit. This I/O circuit has two serial interface ports 230, 232, in which one of the ports 232 is connected to a POS terminal and the other port 230 is connected to its server computer, for example, a Unix server, as shown in FIG. 6.

The microcontroller 102 is adapted to control the data processing functions performed by the data tap. As an example, the microcontroller may be an 8-bit microcontroller such as model no. MC68HC11A1 manufactured by the Motorola Corporation. This microcontroller is limited to controlling 64 k-bytes of data, which is entirely adequate for the task.

The memory segmentation and selection circuit 104 includes a EPROM 106 and a RAM 108. This circuit is adapted to apportion areas of the EPROM and RAM as required. Since the preferred microcontroller is limited to controlling 64 k-bytes of data, the total available memory in the EPROM and RAM is also limited to 64 k-bytes, As a result, in a preferred embodiment, the EPROM has 32 k-bytes of memory capacity in which 8 k-bytes are available and the RAM has 64 k-bytes of memory capacity in which 56 k-bytes are available. The RAM is adapted to receive an operating program from the master computer 25 and to store the same within its 56 k-bytes of available memory. A boot code program is stored within the 8 k-bytes of available memory in the EPROM. Predetermined subroutines may also be stored in the EPROM.

A power supply 122 receives power from an external power source, for example, a 115 V., 60 Hz outlet, and transforms the 115 V. power to 5 Vdc which is used to power the data tap 22. Alternatively, the power supply may be configured so as to receive other input power which, for example, may be 230 V., 50 Hz, or other power available in other countries.

A unique serial number circuit 114 is provided. It includes an integrated circuit and is adapted to generate a unique 48-bit number. This unique number is supplied via the bus 110 and the LAN I/O circuit 120 to the master computer 25. The master computer supplies this 48 bit number to the central computer 12. Alternatively, this number is replaced with a smaller unique number, for example, an 8-bit number, which may be supplied to the central computer. This number provides a means for identifying the data tap and the corresponding POS station.

As an example, the central computer can identify a malfunctioning POS station to the store owner through use of the unique identification number. Further, in the event that a POS station is disconnected, either intentionally or unintentionally, the central computer can identify the disconnected POS station by use of the identification number.

The data, address and control bus 110 provides a means for a controlled data transfer between the microcontroller 102, memory segmentation and selection circuit 104, programmable serial I/O circuit 112, unique serial number circuit 114, parallel I/O circuit 116, LEDS 118 and 119 and LAN I/O circuit 120.

When power is applied to the data tap 22 from the power supply 122, the boot code program stored in the EPROM 106 is executed by the microcontroller circuit 102. As a result, the main operating program is downloaded from the master computer 25 into the RAM 108. The microcontroller then executes the program which was recently stored in the RAM. The subroutines stored in the EPROM may be addressed during execution of the main program.

As previously described, the data tap 22 is connected between a printer and a data entry terminal by way of the parallel I/O circuit 116. Further, the data tap is coupled to the master computer 25 by way of the LAN I/O circuit 120.

As it has been indicated above, a data template can be used to capture data either from the data displayed on the screen of the input terminal, or from the data sent to the printer to prepare a printed record of the transaction.

Assuming that printer data is to be captured, printer data is sent from the input terminal to the data tap, where the data is temporarily stored in the RAM 108. While the data to be printed is temporarily stored in the RAM, the data tap executes the trapper routine so as to determine if the data to be printed contains relevant video record transaction information. As an example, if this determination indicates that the document to be printed is an invoice, then data appearing at specific locations, will be captured. That data typically includes the invoice number, the video title, etc. The data captured is temporarily stored in the RAM and later is transmitted to the master computer for storage until it is uploaded to the central computer.

The stored data also is supplied through the parallel I/O circuit 116 to the printer in a regulated manner. Therefore, the data tap also functions as a data buffer for the printer.

If it is screen data which is being captured, and if the POS system uses a data tap, the captured or trapped data is sent to the data tap where it is temporarily stored. By detecting the unique character or characters which are placed at the beginning and the end of the trapped data by the trapper program, the data tap is able to distinguish trapped data from data which is to be printed. This prevents the trapped data from being mistakenly supplied to the printer and then printed. The data temporarily stored in the data tap is subsequently supplied to the master computer 25.

The master computer repeatedly polls all of the data taps in a POS system in sequence to determine if they have data to be transmitted to the master computer. If a data tap has any such data, the master computer signals the data tap to transmit it. The data is transmitted in separate data packets, one for each polling cycle, as it is commonly done in computer networks.

Still referring to FIG. 7, light-emitting diodes ("LED's") 118 and 119 are used for providing information relevant to the operation of the data tap 22 to the operator. The activation of the green LED 119 indicate that the master computer is attempting to communicate with the data tap. The activation of the red LED 118 indicates that the data tap is properly communicating with the master computer.

Additionally, the LED's 118 and 119 are utilized for fault isolation or error detection by causing the LED to blink.

SMALL FOOTPRINT TERMINAL

FIG. 10 is a perspective view of the small footprint terminal ("SFT") 23, and FIG. 8 is a block diagram of the circuitry of the SFT. The SFT 23 also is shown in FIGS. 1 and 2.

The SFT, as shown in FIG. 10, includes a housing 500 with an upper surface 501. A display 148 and a keypad 50 are located on the upper surface 50.

The SFT circuit shown in FIG. 8 includes a microcontroller 140, a memory segmentation and selection circuit 142, the display 148, a keypad controller 150, the keypad 50, a data, address and control bus 154, a programmable serial I/O circuit 156, a parallel I/O circuit 162 and a LAN I/O circuit 164.

The memory segmentation and selection circuit 142 includes an EPROM 144 and a RAM 146. Circuit 142 controls the configuration of the EPROM 144 and RAM 146. In a preferred embodiment, EPROM 144 contains 64 k-bytes of which 8 k-bytes are available and RAM 146 contains 64 k-bytes of which 56 k-bytes are available. A boot-up program is stored within the EPROM 144.

Preferably, the microcontroller, EPROM, RAM, I/O circuits, power supply and memory control circuits are the same as in the data tap 22 so as to take advantage of standardization as much as possible.

The display 148 is adapted to display operator requested data. The display also may provide the operator with other useful information. For example, in the event that network communications with any of the master computer 25, the printer 16, the bar code reader 18, the credit card reader 28 or the cash drawer 15 are interrupted, an error message will be displayed. To aid during the installation of the system, installation messages may be displayed. Further, if the printer runs out of paper or if input data is in an incorrect format (e.g., the data does not contain the required number of numerals), an error message will be displayed. Furthermore, prompts to assist in the use of the credit card reader and the cash drawer also may be displayed.

Referring now to FIG. 10, as well as FIG. 8, the display preferably is a two-line by 40 character wide reflective dot matrix liquid crystal display ("LCD"). Alternatively, the display can be a two-line by 24 character wide LED or vacuum fluorescent display, or one of a number of known, relatively inexpensive and compact displays.

The keypad 50 has keys of the type having a tactile feel, with graphic overlay.

The keypad 50 has numeric keys 534 which include ten keys for the numbers 0 through 9, and a decimal point key 523. These keys allow entry by the operator of rental, sale and customer identification numbers, quantity, discount information and price changes, and other numerical information.

The keyboard has five edit keys which include a Clear All key 502; a Clear Item key 504; a Scroll Up key 508; a Scroll Down key 510; and a Back Space key 524.

Pressing the Clear All key 502 clears all items or entries in the current transaction, and returns the display 148 to a ready state. Any data which was displayed on the display 148 is not forwarded to the master computer 25.

The Clear Item key 504 clears the customer identification, item identification and/or the price of the item currently being displayed. This allows a revised customer identification, item identification and/or price of the current item to be entered and displayed.

The Scroll Up and Scroll Down keys 508 and 510 change the lines which are displayed. As a result, when a customer has changed his or her mind about a transaction, or when an error has occurred, the operator is able to go back to a line which had been previously entered so that the operator may revise the line as desired. The backspace key 524 moves the operating display cursor (not shown) one space to the left each time this key is depressed. In so doing, the character occupying this space is deleted.

The keypad has programmable function keys which include a Tape Return key 506; a No Tax Total key 512; a Print key 514; a Sell key 516; a Quantity key 518; a Discount key 520; a New Price key 522; a Customer key 526; a Rental key 528; a Total key 530; and an Amount Tendered key 532. The functions of these keys will be explained below.

OPERATOR USE OF THE SMALL FOOTPRINT TERMINAL

The small footprint terminal 23 is surprisingly versatile for a unit so small and inexpensive. It can be used to enter video record transactions and the sales of widely varying merchandise which also might be offered in the same store. It can be used to enter the sales of goods and beverages; clothing; hardware, and many other items as well as the sale, rental or return of video records.

This versatility facilitates the installation of video record rental counters or departments in retail food stores, grocery stores, hardware stores, and many other types of stores which often do not rent video records, thus increasing the income of the stores, and expanding the distribution outlets for the video records.

When the terminal is used as a part of a revenue-sharing video record rental it also facilitates the participation of the user in the revenue-sharing plan.

The use of the SFT to enter such a wide variety of transactions now will be described.

When power is first applied to the POS system including the SFT, the microcontroller 140 (FIG. 8) provides an operator message or "prompt" display via bus 154 to the display 148. The "prompt" is shown in Display 1 below.

DISPLAY 1

```
Ready>_              6:15 PM
Enter Customer/Item ID or Price
```

Display 1 instructs the operator to enter the customer number, or the Item identification number, or the price. If the transaction is a video record rental, the customer number is entered. The item I.D. or price is entered for other transactions.

All of this information can be input by use of the keypad 50. The Item identification can be entered by use of the bar-code reader to read the number off of the product, or by use of the keypad. In the situation in which the price is to be entered, as later described, the price will be input by means of the keypad.

EXAMPLE OF RENTAL TRANSACTION

Following is an example of the use of the SFT to record a rental transaction in which two video cassettes are rented to one customer.

In response to Display 1, the operator enters the customer's identification number, which is 1234567. Then, Display 2 appears, instructing the operator to press the appropriate function key,

DISPLAY 2

```
Ready >1234567_
After Entry Press Function Key
```

The proper function key is the Customer key 526 (FIG. 10) which is pressed to indicate that the number is a customer number. Then, the SFT displays the customer's name and any late fees which the customer owes, as shown below in Display 3. In this example, the late fee owed is zero.

DISPLAY 3

```
Item>_          Late Fee $ 0.00
1234567 John Smith
```

Next, the identification number of the first video cassette of the two to be rented is entered, by means of the keypad or bar-code reader. Upon entering this number, the operator is instructed to press the appropriate function key, as shown below in Display 4.

DISPLAY 4

```
Item>8910234567890_
After Entry Press Function Key
```

Since this video cassette is being rented, rather than sold, the Rental key 528 (FIG. 10) is pressed. As shown below, in Display 5, pressing the Rental key causes the title, rental return date and price of renting that cassette to be retrieved from memory in the master computer and displayed on the SFT display 148.

DISPLAY 5

```
Item>_       Due Monday $ 2.98
8910234567890 Title 1
```

Next, information relating to the rental of the second video cassette ("Title 2") is entered and displayed using the same steps as those described above for the rental of the first video cassette. These steps are shown by displays 6 and 7 below.

DISPLAY 6

```
Item> 1234567890123_
After Entry Press Function Key
```

DISPLAY 7

```
Item>_       Due Monday $ 2.98
1234567890123 Title 2
```

Next, the Total key 530 is pressed. As shown below, in Display 8, pressing this key causes the total amount, including tax, to be calculated and displayed. Further, individual subtotals of the rental charge; charges for any sales included in the transaction; and tax amounts also are displayed.

DISPLAY 8

```
Item>_              Total $    4.20
Rent  3.96  Sell  0.00  Tax    .24
```

Assume, at this point, that the customer gives the operator $5.00 in payment for the rentals. The operator enters "5.", and is instructed to press the appropriate function key, as shown below in Display 9.

DISPLAY 9

```
Item>5._
After Entry Press Function Key
```

The operator presses the Amount Tendered key 532, which causes the amount of change owed the customer to be computed and displayed, as shown below in Display 10.

DISPLAY 10

```
Item>_          Change  $  .80
Amount $ 5.00   Total   $ 4.20
```

Next, signals are supplied to the drivers 157 and 158 (FIG. 8) so as to open the cash drawer and activate the buzzer 159. The buzzer warns the operator that the cash drawer is open.

If the POS system is configured to automatically print a customer invoice, a data signal containing certain portions of the information relating to the transaction is supplied from the microcontroller 140 via the bus 154 and the parallel I/O circuit 162 to the printer. Upon receipt of this signal, the printer prints a customer invoice. If the POS system is not so configured, an invoice can be printed by pressing the Print key 514.

RENTAL RETURN TRANSACTION

If the transaction is the return of a rented tape cassette, the operator again inputs the customer's identification number in response to Display 1. Alternatively, in this situation, the customer identification number need not be entered.

Now, the operator presses the Customer key 526, and then the Tape Return key 506. In response, the program of the SFT causes the display of the title of the rental cassette; the due date for its return; and any late fees due for late return of the rental cassette.

The Total key 530 and the Amount Tendered key 532 can be used in the manner described above to complete the transaction, and the Print button can be used to print an invoice for the further fees.

SALE OF A VIDEO RECORD

If a video record is being sold, rather than rented, the operator enters the cassette identification number in response to Display 1, and presses the Sell key 516 this identifies the transaction as a sale rather than a rental. Preferably, the data regarding this transaction, as well as the record rental data is captured, saved and eventually uploaded to the central computer.

The sales transaction is concluded in the same manner as the other transactions described above.

SALES OF OTHER MERCHANDISE

Sales of merchandise other than video records can be handled in the same way as for record sales, where the product has an identification code.

Sales of merchandise which has no product code, or sales where the store does not use product codes for merchandise other than records, can be handled in another fashion. When Display 1 appears, the operator simply enters the price of the item together with a decimal point (e.g. "10."), and the program recognizes this as a sale, and the price and the words "DIRECT SALE" are displayed.

The sales transaction then is completed in the same way as other transactions.

In sorting the data concerning video record rentals or sales from other transactions, the identification numbers on the cassettes are used to identify the product as a video record. This causes the data for the transaction to be arranged in a predetermined format. A template is used, in the manner described above, to identify the display, and to data capture selected parts of the data, and to save and upload the data to the central computer.

Various other function keys are provided to assist in recording rental and sales transactions.

The No Tax Total key 512 is used to calculate a subtotal without including sales tax. Upon depressing this key, "NO TAX TOTAL" and the corresponding cost is displayed on the display 148.

The Quantity key 518 can be used to enter quantity of the item being sold or rented, where more than one such item is being sold or rented. The resultant cost (i.e., quantity x unit price of the item) is displayed.

If the item is being rented, the Quantity key 518 is used to input the number of rental periods, for example, the number of days, for which the customer desires; to keep the record. In this situation, the due date and the price are displayed.

The Discount key 520 can be pressed after either an item has been entered, or the Total key 530 has been pressed. In the former situation, the discount entered is applied to the associated item to reduce its price. In the latter situation, the discount entered is applied to the total cost of the transaction.

In either situation, the discount value is interpreted by the SFT 23 as an actual discount amount, if the decimal point key 523 is used. However, if the decimal key is not used, then the discount is interpreted as a percentage.

The Change Price key 522 is used to override the stored price and manually enter a new price of an item. This allows incorrect or outdated rental or sales prices stored in the data base of the master computer 25 to be corrected. This key may also be used to modify a late fee. However, this key can not be used to change either the total amount of the transaction or the applicable tax.

As it is shown in FIG. 10, the keys on the keypad 50 have been arranged optimally. For example, the four most frequently used function keys (that is, the Customer, Rental, Total and Amount keys) are arranged in an array located on the right hand portion of the keypad and in a sequence which is anticipated to be that most often used in a rental transaction.

The numeric keys 534 are arranged in a pattern substantially similar to that of most calculator keypads. Further, the more frequently used keys such as the Customer, Tape Return, etc. keys are wider or higher than the other keys and also are identified with distinctive colors.

This arrangement makes the keypad 50 very user friendly. As a result, daily operations are relatively easy to perform. Further, training time for new operators is minimized.

The SFT achieves its compact size and low cost in part by the elimination of the 26 letter keys of the usual keyboard. It also uses a display of greatly reduced size and cost to achieve those results.

Despite the lower cost and smaller size, the terminal is versatile and reliable. More over it is not "dumb"; it has its own "intelligence" and storage capacity, and programming which helps it achieve versatility.

SFT TERMINAL CIRCUITRY

Referring again to FIG. 8, the keypad controller 150 preferably is a microprocessor, such as the model number 16C54 microprocessor manufactured by the MicroChip Corporation. The chip 150 contains a ROM. Stored in this ROM is a program used for controlling the keypad operation. The keypad controller is adapted to "debounce" the keypad in a conventional manner, and to transmit data corresponding to the operator-selected keys to the microcontroller 140.

Circuits 156, 157 and 162 provide tke respective interfaces for the bar code wand 18, the cash drawer 17 and the printer 16.

The programmable serial I/O circuit 156 contains a universal asynchronous receiver transmitter (UART) integrated circuit device and is adapted to provide a serial interface for the bar code wand. As a result, data received from the bar code wand is supplied to the microcontroller 140.

The driver circuit 157, in response to a predetermined signal from the microcontroller 140, supplies an enabling signal to the cash drawer 15 which causes the cash drawer to open. An additional predetermined signal is supplied from the microcontroller 140 through a driver circuit 158 to a buzzer 159. The buzzer 159 is activated to inform the operator of the opening of the cash drawer.

The parallel I/O circuit 162 is adapted to enable data transfer between the SFT 23 and the printer 16. Circuit 162 includes a parallel port which may function in a bi-directional manner, that is, as either an input or an output port.

The buzzer 159 is also actuated if one of the previously-described error messages is displayed, or when a function is completed which has taken longer than a predetermined time, for example, a few seconds, to complete. In this latter situation, the use of the buzzer helps to reduce operator fatigue, by allowing the operator to direct his or her attention away from the SFT 23 during relatively long processing time periods.

The buzzer also is activated if a key is pressed out of the correct sequence. In this situation, the display 148 will display an "INVALID KEY" message for a predetermined time period which, for example, may be approximately one second.

The data, address and control bus 154 is connected to the circuits of the SFT 23 as shown in FIG. 8. This bus provides a controlled path by which data may be transferred between the circuits of the SFT.

The unique serial number circuit 160, LAN I/O circuit 164 and the power supply circuit 166 are substantially similar to the unique serial number circuit 114, LAN I/O circuit 120 and power supply circuit 122, previously explained with reference to FIG. 7 and, as such, will not be further described.

Upon applying power to the SFT 23 through the power supply circuit 166, the boot-up program stored in the EPROM 144 is executed by the microcontroller 140. This causes an operating program from the master computer 42 to be downloaded into the RAM 146. Thereafter, the microcontroller 140 executes the operating program stored in the RAM 146.

As with the EPROM 106 of FIG. 7, the EPROM 144 may contain predetermined subroutines which may be referenced in the operating program. When this occurs, such subroutines will be read from the EPROM 144 and executed during the execution of the operating program by the microcontroller 140.

The SFT 23 is enabled to receive incoming data from the master computer 25 via the LAN I/O circuit 164. The SFT may also receive incoming data from the bar code reader 18 or the credit card reader 28 via the programmable serial I/O circuit 156.

The SFT also receives operator-input data from the keypad 50. The SFT, through use of the microcontroller 140, provides data to the printer 16 and the display 148, and provides enabling signals to the cash drawer 15. The SFT also supplies data relating to completed transactions via the LAN I/O circuit 164 to the master computer 25.

Cable connectors (not shown) are provided at the rear of the SFT 23 for cable connections to each of the bar code wand; the credit card reader; the printer; the cash drawer; and the LAN.

The small footprint terminal provides a relatively simple, compact and inexpensive sales terminal for POS systems in general, and particularly for video record rental and sales activity. By recognizing that the full keyboard, video screen and other features of a full-feature input computer are not necessary, applicants have lowered the cost and space requirement for entry into the efficient computerized business operations, and revenue-sharing video record rentals.

LAN ADAPTER

FIG. 9 is a block diagram of the LAN adapter 27. The LAN adapter enables data communications between the master computer and all units which are connected to the LAN adapter, including, for example, SFT's and data taps. The LAN adapter circuitry preferably is configured to be mounted on a single printed circuit board which may be inserted into an expansion slot of the master computer. Upon being inserted into the expansion slot, the LAN adapter card is connected to the master computer's bus. This enables power to be supplied to the LAN adapter and enables data transfer.

The LAN adapter includes a microprocessor 180, a memory segmentation and selection circuit 182, a programmable serial I/O circuit 188, a LAN I/O circuit 190, a dual port arbitration circuit 192 and a dual port RAM 196.

The microprocessor, I/O circuits, and memory circuits preferably are the same as corresponding components in the data tap and SFT, to obtain the benefits of standardization.

The memory segmentation and selection circuit 182 includes an EPROM 184 having 32 k-bytes of memory capacity and a RAM 186 having 64 k-bytes of memory capacity. The circuit 182 is adapted to function in a manner similar to that of the previously described memory segmentation and selection circuits 104 and 142. That is, the EPROM 184 is adapted to store a boot code program. This stored boot program is executed by the microprocessor 180 when power is applied to the LAN adapter or when the microprocessor is reset.

As a result of executing this program, a main operating program is downloaded from the master computer into the RAM. The main program is then executed by the microprocessor. This program enables the LAN adapter to perform a rapidly repeating polling of the units connected to the LAN adapter. The results of this polling are supplied to the master computer, and the master computer responds accordingly. For example, as previously described, data taps are periodically polled to determine if they have data for the master computer. If they do, then the master computer may request such data be transmitted to the master computer by way of the LAN adapter.

The dual port RAM 196, which in a preferred embodiment is an 8 k-byte dual port RAM, enables the LAN adapter to communicated with the master computer in an asynchronous manner. Utilizing such a dual port RAM increases the amount of data transfer between the adapter and the master computer by eliminating the need for hardware interrupts. However, only one of the LAN adapter and the master computer may access the dual port RAM at a given time. Controlling which of these devices has access to the dual port RAM is performed by the dual port arbitration circuit 192.

The dual port arbitration circuit 132 generates a control signal which indicates when the dual port RAM is activated. This control signal is supplied from the dual port arbitration circuit to the master computer. In response to this control signal, neither the LAN adapter nor the master computer will attempt to access the dual port RAM while the dual port RAM is in use. That is, whichever first accesses the dual port RAM asserts an arbitration/bit flag so as to deny the other access until the bit is reset.

The dual port arbitration circuit all. so sets the address range of the dual port RAM. Since in the preferred embodiment the dual port RAM contains 8 k-bytes of memory capacity, the dual port RAM only requires an 8-k address range. However, the master computer is typically adapted to address a memory from within a 24-bit address range and the LAN adapter is adapted to address a memory from within a 16-bit address range. To accommodate this difference in address ranges, an 8-bit memory offset address switch 194 is utilized. That is, this offset address switch shifts the 8-k address range of the dual port RAM within the 24 bit address range of the master computer as required.

The LAN I/O circuit 190 is adapted to transmit and receive data to and from the devices connected to the LAN adapter such as a data.tap and a SFT. Communications between these devices and the LAN I/O circuit are differentially driven by using, for example, RS-422 and RS-485 interfaces. This LAN I/O circuit operates substantially similar to the previously described LAN I/O circuits 120 and 164 and, as such, will not be further described.

The programmable serial I/O circuit 188 is adapted to transform data between serial and parallel format. In a preferred embodiment, the programmable serial I/O circuit contains a universal asynchronous receiver transmitter (UART).

A LED 191 is coupled to the LAN I/O circuit 190 and is adapted to provide an indication of the current operating status of the LAN adapter. For example, a lit LED indicates that the LAN adapter is being addressed.

As shown in FIG. 9, the data, address and control bus 198 enables controlled communications between the microprocessor 180, memory segmentation and selection circuit 182, programmable serial I/O circuit 188 and the dual port arbitration circuit 192. Communication between the programmable serial I/O circuit 188 and the LAN I/O circuit 190 is by way of a bus 199. Likewise, communication between the dual port arbitration circuit 192 and the dual port RAM 196 is by way of a communication bus 197.

Thus, the LAN adapter performs polling of the attached slave units and processes commands received from the master computer for transmission to the respective slave units.

By performing the polling function in the LAN adapter, instead of the master computer, the demand on processing cycles is reduced in the master computer. As a result, a master computer having slower processing speed may be utilized, thus reducing the costs. Alternatively, the master computer may use the processing cycles saved in performing additional functions.

By utilizing the RS-422 or RS-485 interfaces, data communication over a relatively long path can be accommodated.

If only one POS station in a store is needed, without SFT's or data taps, the LAN adapter is not required. However, if additional check-out stations are added and one or more SFTs or data taps is added, the LAN adapter can be installed easily in an expansion slot of the master computer.

In some personal computer operating environments, such as those supporting a graphical user's interface (GUI), for example, WINDOWS ® from the Microsoft Corp. and OS/2 ® from the Microsoft or the IBM corporations, screen displays may be controlled on a bit-by-bit basis. In these circumstances, the TEACHER and TRAPPER programs may be modified so as to be used therein. These modified versions may be responsive to ASCII or other standard coding methods. However, the ASCII representations are not typically written directly to the display controller, but would be otherwise communicated within the operating environment in a way that is easily accessible by the TEACHER or TRAPPER.

Although preferred embodiments of the present invention have been described in detail herein, it is to be understood that this invention is not limited to those precise embodiments, and that many modifications and variations may be made by those skilled in the art without departing from the spirit and scope of the invention as defined by the following claims.

We claim:

1. A point-of-sale system comprising, in combination, data entry means for entering data concerning the sale and/or rental of merchandise, means for developing display signals corresponding to said data, display means responsive to said display signals for displaying said data in visual form, and data collection means for receiving said display signals and selecting from said signals those representing predetermined data, and sending said predetermined data to a remote location for processing.

2. A system as in claim 1 in which said data collections means is responsive to signals in ASCII code form.

3. A system as in claim 1 in which said merchandise includes video records, and said predetermined data includes data regarding rental transactions for video records.

4. A system as in claim 3 in which said remote location is a computer processing location in a revenue-sharing system for computing and sorting shares of rental revenues.

5. A system as in claim 1 in which said display means is a member of the group consisting of a character display screen and a printer.

6. A system as in claim 5 in which said display screen, printer and data collection means all are responsive to ASCII code.

7. A system as in claim 1 in which said data collection means includes data template means for selecting said signals based on the position of the images produced by said signals in said display means.

8. A system as in claim 1 including a master computer and LAN adapter means connecting said data entry means together with said master computer in a local area network.

9. A system as in claim 8 in which said data entry means includes a small-footprint point of sale terminal for entering sales and rentals of merchandise, including sales and rentals of video records, said terminal comprising, in combination, a housing, a small display in said housing for displaying at least one line of character images, a keypad in said housing, said keyboard having numerical entry keys, programmable function keys, and substantially less than a full complement of alphabetic character entry keys, connector means for connecting said terminal to said master computer in said local area network, and dedicated key input means for operation to identify to said master computer a video record rental transaction.

10. A system as in claim 8 in which said remote location is a computer processing location in a revenue-sharing system for computing and sorting shares of rental revenues and recipients thereof, said master computer of said local area network being programmed with software operable with that of the computer at said remote location to upload data to the remote computer and receive downloaded data from said remote computer.

11. A system as in claim 8 in which said remote location is a computer processing location in a revenue-sharing system for computing and sorting shares of rental revenues, said master computer of said local area network being programmed with software operable with that of the computer at said remote location, said data collection means being connected to said data entry means and operating to deliver said predetermined data to said remote location in compatible form, without altering the programming of said master computer.

12. A data collection device for selecting predetermined output data signals from output data signal streams created by diverse types of miniature computers, said data collection device comprising data collection means for selecting said predetermined data signals from said data signal streams in response to output data signals for delivery to a visual display device in a form common to said diverse types of miniature computers, and means for transmitting the selected predetermined data signals to a utilization location separate from the destination of said data signal streams.

13. A device as in claim 12 in which the data in said streams is in ASCII display code.

14. A device as in claim 12 in which each of said miniature computers is a part of a point-of-sale system including display and printer means connected to receive said output data streams and adapted for rental of video records.

15. A device as in claim 12 in which said data collection means includes data template means for selecting said predetermined data signals based on the position of images produced by said output data signals in said visual display device.

16. A device as in claim 12 including means, programmed to form movable variable areas on said visual display device to permit positions on said visual display device from which signals are selected to be changed either by local operation of one of said miniature computers, or remotely from a remote computer at said utilization location.

17. A revenue-sharing video record data collection system for collecting data from a plurality of remote video record marketing locations and for transmitting selected portions of said data to a revenue-sharing computer at a computing location, said system comprising, in combination, a point of sale system at each of a plurality of marketing locations, each of said point of sale systems comprising, in combination, data entry means for entering data concerning the sale and/or rental of merchandise, means for developing display signals corresponding to said data, means responsive to said display signals for displaying said data in visual form, and data collection means for receiving said display signals and selecting from said signals those representing predetermined data, and sending predetermined data to said revenue-sharing computer.

18. A data collection system as set forth in claim 17, in which said predetermined data is that relating to video record rentals, and said revenue-sharing computer is adapted to compute the shares of record rentals due the participants in said system.

19. A data collection system as set forth in claim 17, in which said point of sale system includes means for storing the data selected, and dial-up modem means for periodically sending the stored data to said revenue-sharing computer through public communications channels.

20. A method of selecting predetermined output data signals from output data signal streams created by diverse types of miniature computers, said method comprising the steps of analyzing the display signals for displaying images using the display means of any one of a plurality of said diverse types of miniature computers, utilizing a circuit device, responsive to data in a single display code used by all of said display signals, for selecting predetermined data from said output data signal streams, and transmitting the selected predetermined data to a utilization location separate from the destination of said data signal streams.

21. A method as in claim 20 including the step of displaying images corresponding to said display signals on a display device selected from the group consisting of an electronic display panel and a printer.

22. A method as in claim 20 including the step of formatting said signals for display in a predetermined format, and in which said analyzing step comprises determining the position of said data in said display.

23. A method as in claim 22 including the step of utilizing a locally-stored computer program to make the selection based on outlines on said display, said outlines being adjustable as to size and position either locally or from a remote computer.

24. A method as in claim 20 including point-of-sale merchandise sale or rental steps, including the steps of recording sales or rentals of video records, in which said analyzing step comprises selecting the signals representing sales or rentals of video records from those representing the sale or rental of other merchandise.

25. A method as in claim 24 including the steps of discriminating the data for sales and rentals of revenue-sharing records from the sales or rentals of all other merchandise, and computing revenue shares due the participants in a revenue-sharing program.

26. A method of incorporating local computerized POS systems into a centralized data processing network utilizing a central computer at a data processing station, the programming of said local POS systems being incompatible with the programming of said computer at said data processing station, said method comprising the steps of connecting data tap means into each POS system to analyze display data signals, said data tap means being adapted to segregate predetermined data signals from the others, and transmitting said predetermined data signals to said central computer.

27. A method as in claim 26 in which said centralized data processing network is for the sharing of revenue from the merchandising of selected products through said POS systems, and said predetermined data signals represent the merchandising of said selected products.

28. A method as in claim 27 in which the selected products are video records merchandised by a method selected from the group consisting of selling the records, renting them, and charging for their use on a per-play basis.

29. A method as in claim 26 in which said display signals are in ASCII form, and each of said data tap means is responsive to ASCII code and is of essentially the same construction regardless of the programming of the POS system it is connected into.

30. A method as in claim 26 in which said display signals are formatted to cause visible representations thereof appear in predetermined locations in a visible display, and said analyzing step comprises determining the location of said data in said display.

31. A method as in claim 26 including the step of programming each data tap means, either locally or remotely, to adapt it to the format of data displayed in each individual POS system, thereby accommodating analysis in a wide variety of formats in different POS systems.

32. A method as in claim 26 including the step of installing original POS equipment at additional merchandising locations in said network, said original POS equipment including software compatible with said central computer and said data tap means for performing the analyzing step, and including means for performing said transmitting step.

33. A method as in claim 32 in which said original POS equipment includes a master computer, a LAN adapter, and at least one data entry terminal comprising a small-footprint point-of-sale terminal for entering sales and rentals of merchandise, including sales and rentals of video records, said terminal comprising, in combination, a housing, a small display in said housing for displaying at least one line of alpha numeric characters, a keypad in said housing, said keypad having numerical entry keys, programmable function keys, and substantially less than a full complement of alphabetic character keys, connector means for connecting said terminal to a master computer in a local area network, and dedicated key input means for operation to identify to said master computer a video record rental transaction.

* * * * *